United States Patent [19]
Bernard et al.

[11] Patent Number: 6,145,170
[45] Date of Patent: Nov. 14, 2000

[54] ANCHOR BEAD FASTENERS AND METHOD OF ATTACHING SAME TO CARGO HOLDER STRAPS FOR HOOK-UP TO KEYHOLE-SLOT ANCHORING SUPPORTS

[75] Inventors: Edward Helmut Bernard; Gordon Alan Bernard, both of Ontario, Canada

[73] Assignee: Bernard Mould, Windsor, Canada

[21] Appl. No.: 09/266,103

[22] Filed: Mar. 10, 1999

[51] Int. Cl.[7] .................................................. B60P 7/00
[52] U.S. Cl. ...................... 24/298; 24/116 A; 24/129 R; 24/130; 24/300
[58] Field of Search ................................. 24/298, 116 A, 24/300, 662, 682.1, 130, 129 R, 129 B

[56] References Cited

U.S. PATENT DOCUMENTS

| | | | |
|---|---|---|---|
| 1,545,501 | 7/1925 | Laird | 24/130 |
| 2,355,705 | 8/1944 | Cohn | 24/298 |
| 2,503,327 | 4/1950 | Fields | 24/130 |
| 3,636,594 | 1/1972 | Faivre | 24/298 |
| 4,178,661 | 12/1979 | Klein | 24/130 |
| 5,035,558 | 7/1991 | Prosen | 24/130 |
| 5,062,184 | 11/1991 | Rowland | 24/300 |
| 5,611,118 | 3/1997 | Bibbee | 24/298 |
| 5,771,912 | 6/1998 | Swetish | 24/116 A |
| 5,772,371 | 6/1998 | Ackerman | 24/129 R |

*Primary Examiner*—Victor N. Sakran
*Attorney, Agent, or Firm*—Reising, Ethington, Barnes, Kisselle, Learman & McCulloch, PC

[57] ABSTRACT

A fastener bead removably affixed to a flexible tension element of a cargo holder and used by removably inserting the bead in the wider portion of a keyhole-type slot in a support structure. The bead in use is trapped and held by the margin of the narrow portion of the keyhole slot. The bead has a through-passageway with axially opposite loop-entrance and loop-exit ends thereof located respectively at first and second opposite end surfaces of the bead. In one bead embodiment an external groove in a bead first side surface is sized for retaining a portion of each two runs of a free-end loop of the tension element disposed in side-by-side contacting relationship after exiting the passageway and lead in the groove toward engagement with trailing portions of the runs that trail back out the entrance end of the passageway as they extend back toward cargo holder attachment. To achieve this bead-held knotting, the loop bight and runs are trained over a second side surface of the bead until the loop bight contacts and crosses over the trailing run portions on the side thereof remote from the bead first side surface and generally where the trailing runs are leading toward entry into the bead passageway. While the bight remains caught by crossing over the trailing portions of the tension element runs, the exited portions of the loop runs are straddle spread back over the bead until they are seated into the bead groove. In another bead embodiment, the bead has a neck-like protrusion lassoed by the tension element loop after it is passed through the bead passageway. Retrograde tension force is exerted on the trailing run portions while restraining the bead cause snug engagement with the bead groove(s) due to the loop bight being caught across the trailing runs or neck-like protrusion to thereby securely but detachably affix the bead to the flexible tension element.

56 Claims, 9 Drawing Sheets

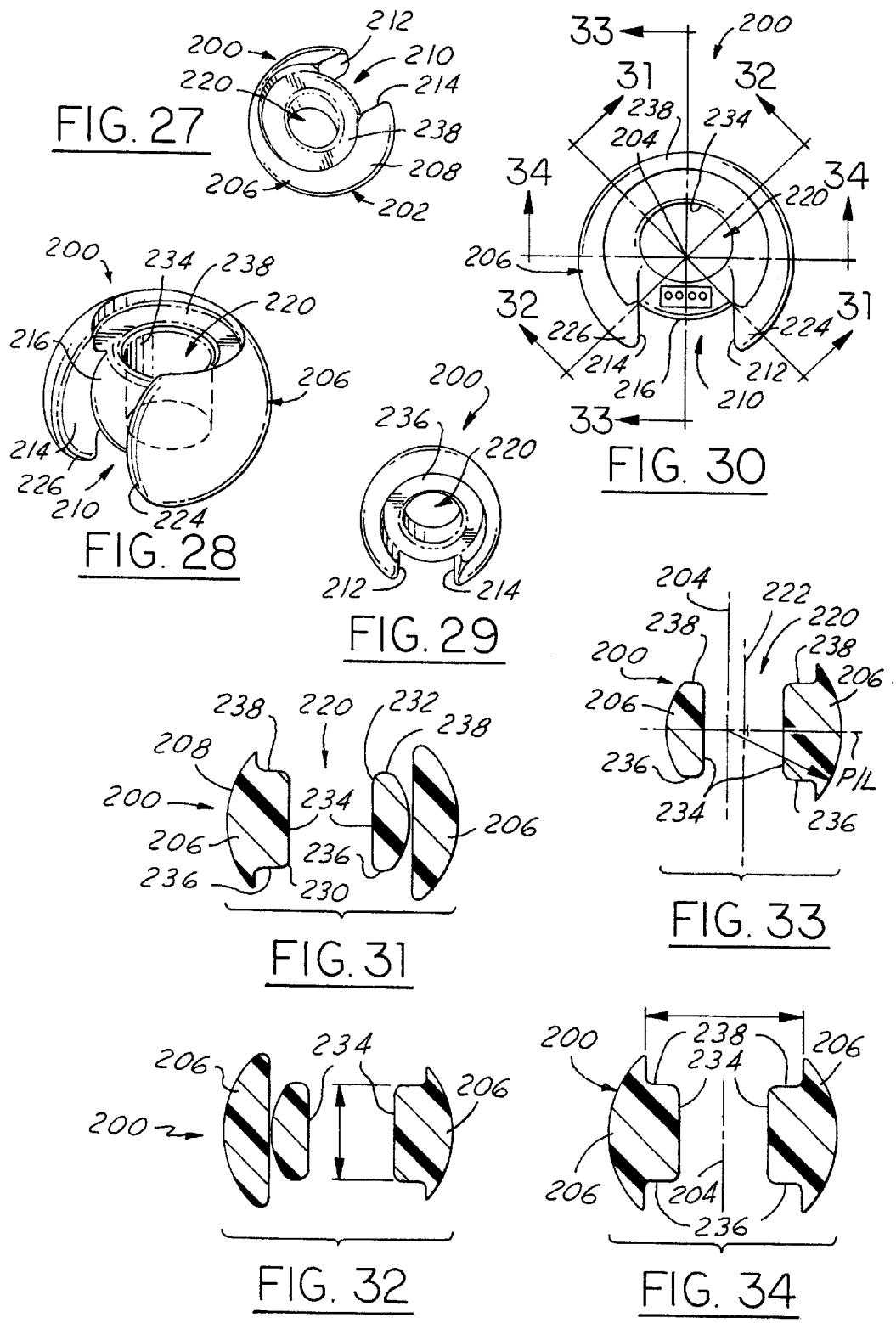

ANCHOR BEAD FASTENERS AND METHOD OF ATTACHING SAME TO CARGO HOLDER STRAPS FOR HOOK-UP TO KEYHOLE-SLOT ANCHORING SUPPORTS

FIELD OF THE INVENTION

This invention relates to flexible receptacles, nets, bags or like cargo holders provided with various types of flexible tension elements such as cord, string, cable rope, etc. in hanging the cargo holder in use, and more particularly to anchor bead fasteners and methods of attaching same to such cargo holder straps and the like for hook-up to keyhole-slot type anchoring supports.

BACKGROUND OF THE INVENTION

In the automotive accessory field, cargo nets are often provided as optional equipment to secure light weight objects in the cargo area of the vehicle. The net attaches to anchors that are already provided in the floor, seat backs, walls, etc., trunk, or truck bed of the vehicle or slots later added. For example, in the 1996 model year Ford Taurus station wagon, the cargo net is constructed of a open net of elastic knitted cord in a rectangular pattern. An elastic endless bungi-type cord covered with a tubular fabric material strung around the perimeter of the net and through non-elastic woven tunnels secured at opposite longitudinal ends of the net. The bungi cord is strung through four plastic molded hooks provided one in each of the four corners and these hooks are removably inserted under a cross bar of an anchoring fixture mounted flush on the floor of the vehicle. The construction of this net, due to the specially configured plastic molded fasteners is relatively expensive, as is the construction and installation of the anchor fixtures in the vehicle. This net hook-up also has limited capability for swinging or pivoting to accommodate various support angles at which the hanger straps or draw cords may need to extend to properly restrain the cargo net in use. Breakage of the fastener hook can therefore occur even if non-excessive stress is applied at the wrong anchoring angle.

It has been proposed as an improvement upon such hook-type fastening systems for cargo nets and the like to provide a large bead fastened in some way to the end of the cargo strap which would cooperate with a keyhole-slot type anchoring structure provided in a support wall of the vehicle. Attachment and removal of the fastener would be by insertion of the bead through the large area opening of the keyhole-slot and then moving the bead along the backside of the slot so that it is restrained by the narrow portion of the slot, with the strap extending through the narrow portion of the slot to its attachment to the cargo holder. Such a bead and slot attachment system offers simplicity in construction of the bead, pivotal load bearing contact if the bead has a surface of revolution to bear against the support wall of the slot, as well as simplifying and strengthening the type of anchoring structure needed to cooperate with the bead and strap. However, attaching the bead to the strap poses a problem particularly if the bead is to be removable. Knotting of the bead may be complicated and time consuming, and the knot may loosen in use. Moreover, the cargo holder strap or cord where it is attached to the bead may prematurely wear and rupture due to abrasion and frictional wear with the edges of the retaining slot in the wall support structure in use due to vibration and movement of the cargo holder with vehicle motion.

Other prior proposals for attaching the anchor bead to the cargo strap have proven unsuccessful for various reasons. One such proposal provides generally parallel passages through an anchor bead with an "island" provided in between the passages. A single strand of the strap or tension element is strung or threaded through one of the passageways, and then the leading end is turned back and threaded in the opposite direction through the adjacent passageway until it exits from the second passageway. The exited end is used to tie a knot with the adjacent run of the strand. Knotting in this fashion provides less than reliable retention. Moreover, such an anchoring bead structure does not accommodate a strap with a pre-made loop or where a straight run of the strap is to be bent into a loop for feeding into to the anchoring bead.

It has also been proposed to make such a twin passage/ center island type bead with an openable cover hinged to swing shut over the passageway on a living hinge with a snap type retention so that a pre-made loop can be dropped into the uncovered passageways and then the cover closed and snapped shut to retain the bead of the loop. However, this is a relatively complicated structure to design into a mold and therefore more costly to manufacture. In addition, separation forces exerted on the two runs where they enter such an arrangement can exert an opening force resulting in unlatching and detachment of such a bead from the cord or strap.

OBJECTS OF THE INVENTION

Accordingly, among the objects of the present invention are to provide an improved cargo holder or retainer receptacle of the type having a flexible hanger tension element secured to the receptacle holder that can either be terminated in the form of a U-shaped loop or folded to form such a loop out of a straight run, and this loop utilized to securely affix the tension element to an improved hanger bead type anchor for securing the receptacle or cargo holder to a keyhole.-type anchoring slot in a supporting structure to thereby provide an inexpensive yet very secure method and apparatus for attaching and supporting the cargo holder or receptacle to the supporting structure.

Another object is to provide an improved anchoring bead for use in attaching to a flexible tension element to provide a cargo holder hanger sub-assembly of the type used by removably inserting a bead in the wider portion of a keyhole-type slot in a support structure, and then the bead moved so as to be trapped and held by the margin of the narrow portion of the slot with the tension element passing outwardly therethrough for attachment to and support of the cargo holder, which enables a U-shaped loop termination of the tension element to be rapidly, reliably and securely attached to the anchoring bead, either manually or by machine, and which can also be easily detached manually for repair or replacement of the anchoring bead and/or associated cargo holder or cargo receptacle.

A further object is to provide an anchoring bead and associated cargo receptacle flexible element attachment structure and method of the foregoing character which protects a flexible tension element from wear due to friction between the supporting structure and anchoring bead, wherein the attachment point of the supporting structure enables pivoting motion to reduce stress on both the anchoring bead and flexible tension element wherein the bead is made in a geometry that is easy to mold due to planar parting lines being used in the plastic injection molded manufacture of the anchoring bead, and where there are minimal variations in cross-sectional thickness in the molded part in order to reduce curing time in the mold and thereby improve overall production cycle time.

Yet another object is to provide an improved anchoring bead attachment structure and method of the foregoing character that is able to take advantage of the resilience stresses of a flexible tension element when the same is an elasticized cord or the like to resist loosening of the attachment knot, wherein the attachment bead can be made of a molded plastic in a variety of materials to provide the best characteristics for varied physical requirements of strength, lubricity, adhesion, flexibility or rigidity and whatever other characteristics are desired as can be offered by different engineering resins and polymers, as well as in a variety of colors for enhanced styling without affecting structure, function or operation.

BRIEF DESCRIPTION OF THE DRAWINGS/FIGURES

The foregoing as well as additional objects along with features and advantages of the present invention will become readily understood from the following detailed description of the best mode presently known to the inventors of making and using the invention, from the appended claims, and from the accompanying drawings (which are to engineering scale unless otherwise indicated) wherein:

FIGS. 12–26 are fragmentary perspective views again sequentially illustrating the method of the invention for attaching the first embodiment anchoring bead to the loop of a flexible tension element, employing the method generally illustrated in FIGS. 7–11 but shown in more detail in the sequential steps of FIGS. 13–26, FIGS. 13, 15, 17, 19, 21, 23 and 25 illustrating the anchoring bead viewed from the slotted side, and the respectively associated views FIGS. 14, 16, 18, 20, 22, 24 and & 26 illustrating the anchoring bead and associated tension element viewed from the non-slotted side of the anchoring bead, i.e., flipped over 180° from the corresponding odd numbered FIGS. 13–25.

FIG. 27 is a perspective view, as viewed from the top side, of a second embodiment anchoring bead of the invention.

FIG. 28 is a perspective view of the second embodiment anchoring bead that is viewed from above and from a different angle from that of FIG. 27, and enlarged thereover.

FIG. 29 is another perspective view of the anchoring bead of FIGS. 27 and 28 as viewed from the underside and at an angle thereto.

FIG. 30 is a top plan view of the anchoring bead of FIGS. 27–29 and generally on the same scale as FIG. 28.

FIGS. 31, 32, 33 and 34 are cross-sectional views taken respectively on the lines 31—31, 32—32, 33—33 and 34—34 of FIG. 30, it being understood that FIGS. 27–34 are CAD drawn to engineering scale from a production engineered embodiment of the invention.

Figure 1:
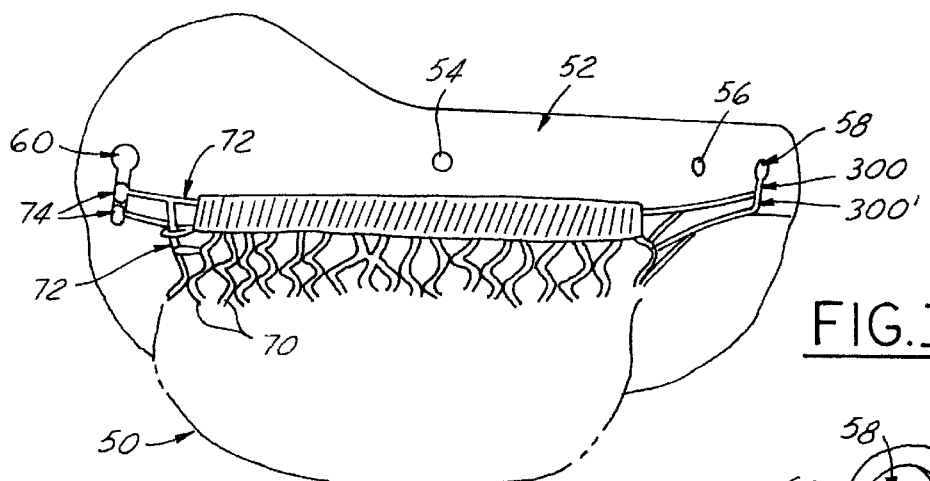
FIG. 1 is a fragmentary side elevational view of a plastic starboard side molding piece of a driver side passenger vehicle seat provided with keyhole-type mounting slots for receiving a small utility-type cargo net provided with two first and third embodiments of anchoring beads in accordance with the present invention for supporting the cargo net from the keyhole-slots of the seat molding.
Figures 2, 3, 4:
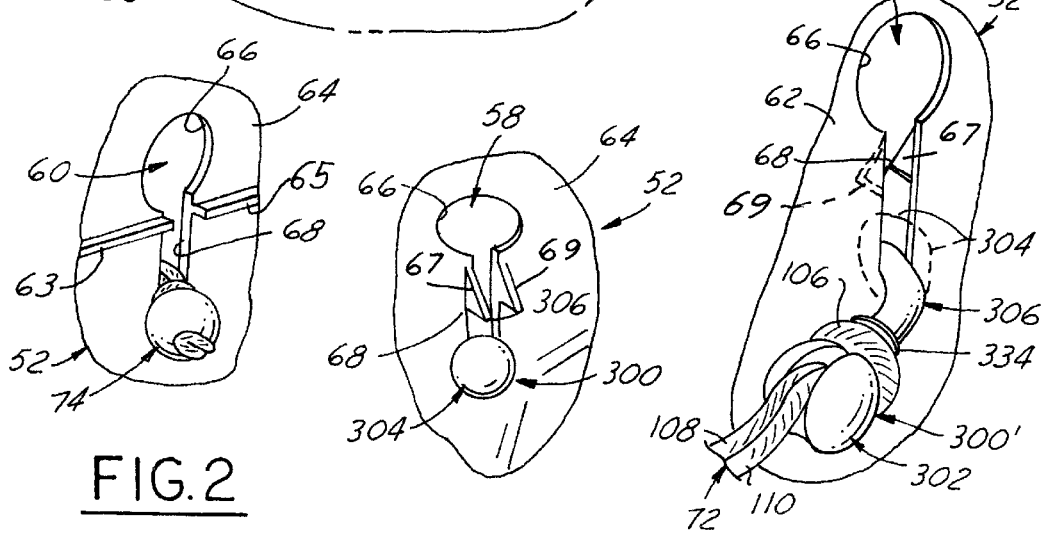
FIG. 2 is a fragmentary view of the reverse side of the seat molding illustrating on an enlarged scale the anchoring bead of the first embodiment secured to the left-hand side (as viewed in FIG. 1) keyhole of the seat molding.
FIG. 3 is a fragmentary perspective view of the right-hand side keyhole-slot (as viewed in FIG. 1) illustrating on an enlarged scale the third embodiment of the anchoring bead of the invention also disposed on the rear side of the slot and with the flexible tension element strung through the narrow portion of the keyhole-slot.
FIG. 4 is a fragmentary perspective view on an enlarged scale of the third embodiment anchoring bead as affixed to the right hand keyhole and as viewed in FIG. 1.
Figure 5:
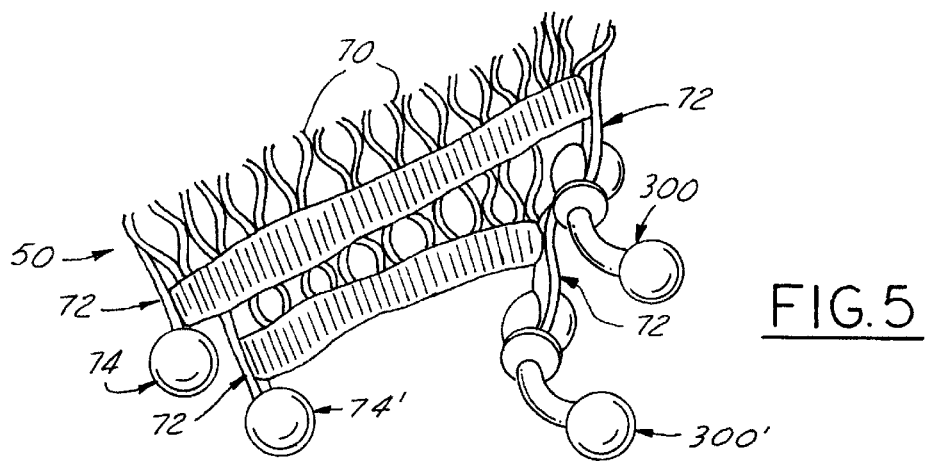
FIG. 5 is a fragmentary perspective view of the utility cargo net of FIGS. 1–4 and illustrating semi-schematically two of the first embodiment anchoring beads individually affixed to the left hand corners of the net (as viewed in FIG. 5) and two of the third embodiment anchoring beads individually affixed to the two right hand corners of the net in accordance with the invention.
Figure 35:
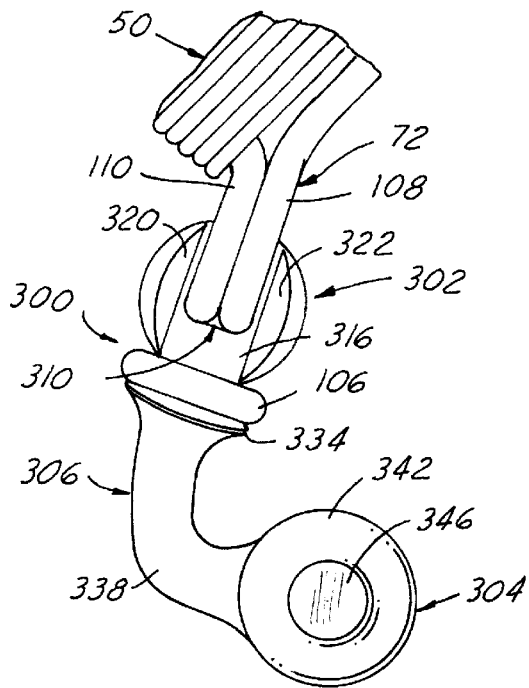

FIG. 35 is a fragmentary perspective view of the third embodiment, goose-neck-type, anchoring bead of the invention with a flexible cargo net tension element secured thereto in accordance with the invention and corresponding to the third embodiment shown in FIG. 4 and in the right-hand side of FIGS. 1 and 5 as described previously.

Figure 36:
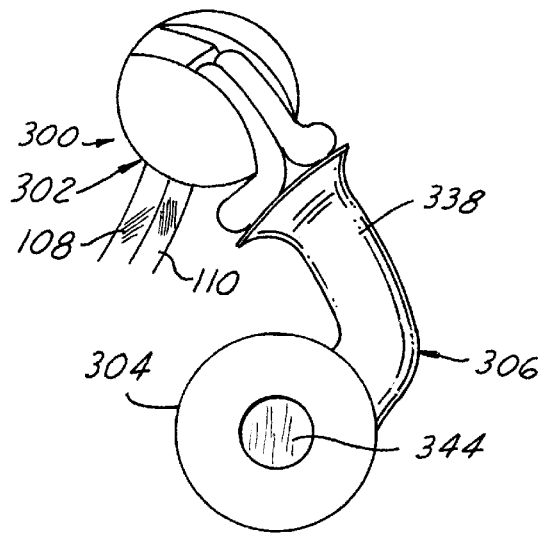

FIG. 36 is a perspective view of the third embodiment anchoring bead and tension element of FIG. 35, but rotated generally 180° from the illustration in FIG. 35.

Figure 37:
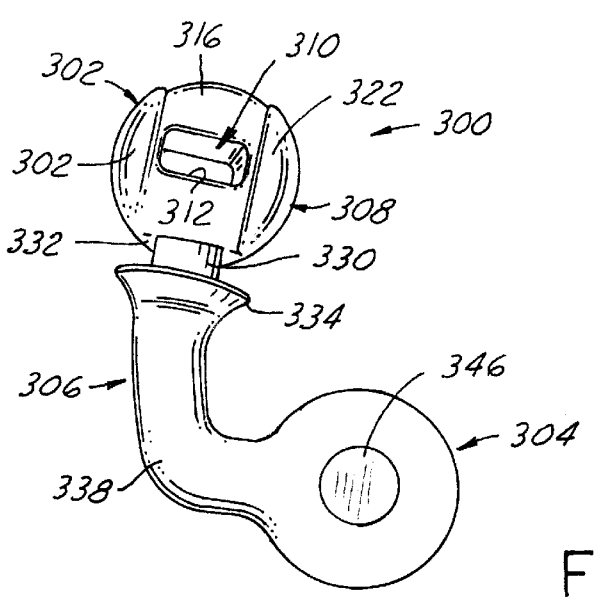

FIG. 37 is a perspective view of the third embodiment anchoring bead of FIGS. 35 and 36, shown by itself.

Figure 38:
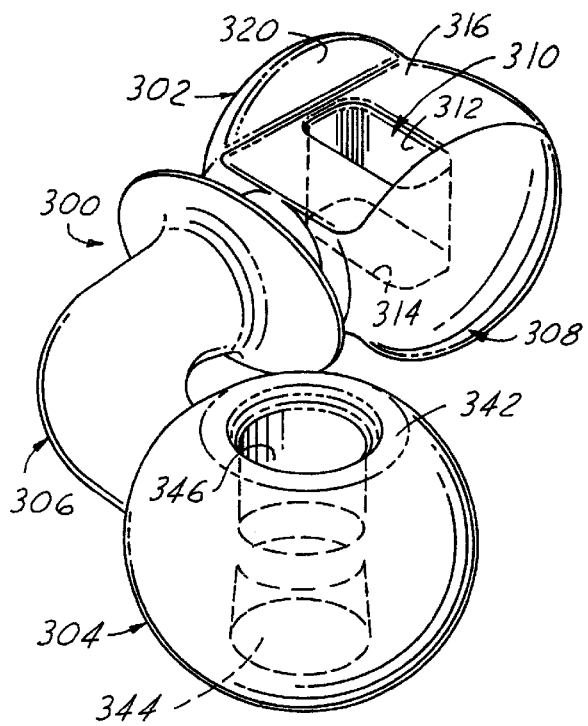

FIG. 38 is a perspective view of the third embodiment goose-neck-type anchoring bead of FIGS. 35–37, viewed from a different angle than that of FIG. 37.

Figure 39:
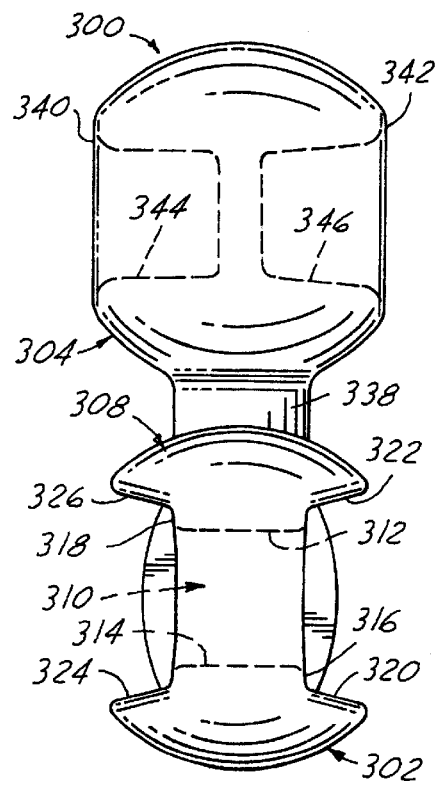

FIG. 39 is a rear elevational view of the third embodiment bead of FIG. 38.

Figure 40:
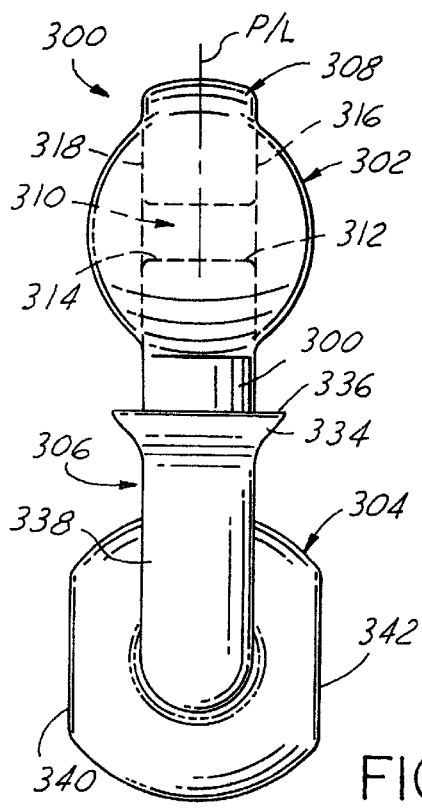

FIG. 40 is a front elevational view of the third embodiment bead of FIGS. 38 and 39, and inverted from the FIG. 39 showing.

Figure 41:
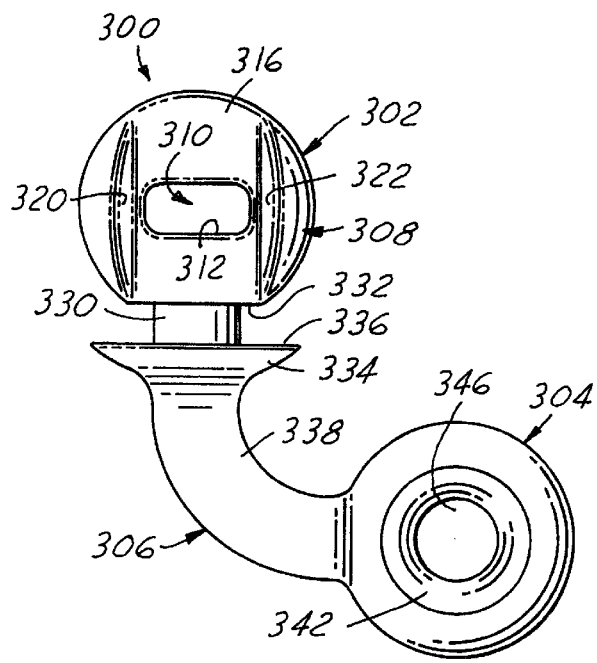

FIG. 41 is a side elevational view of the third embodiment anchoring bead of FIGS. 38–40, it being understood that the views of FIGS. 38–41 are CAD drawn to engineering scale.

Figure 42:
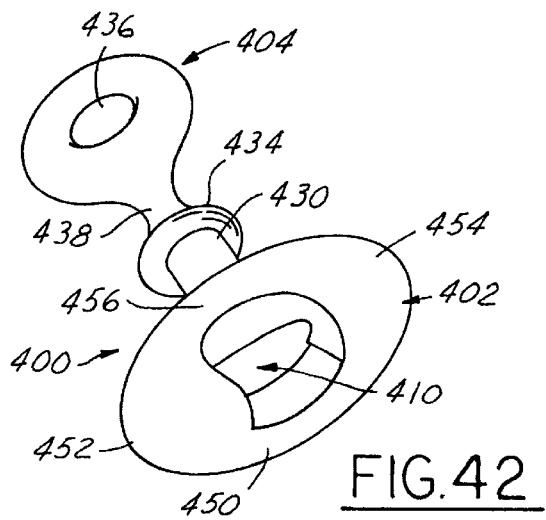

FIG. 42 is a perspective view of a fourth embodiment neck-type anchoring bead of the invention, shown by itself.

Figure 43:
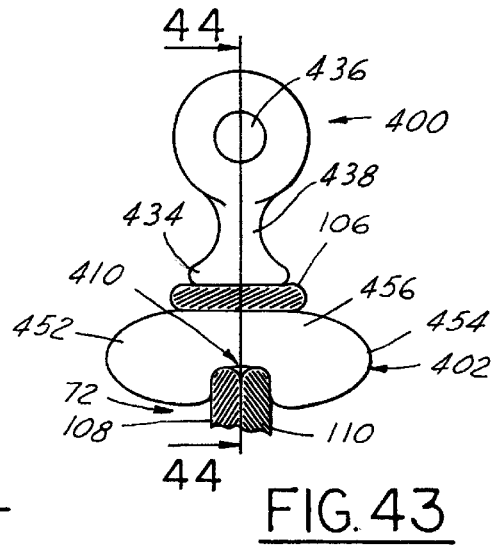

FIG. 43 is a top plan view of the fourth embodiment anchoring bead of FIG. 42 with an associated end loop of a flexible tension element secured thereto in accordance with the invention.

Figure 44:
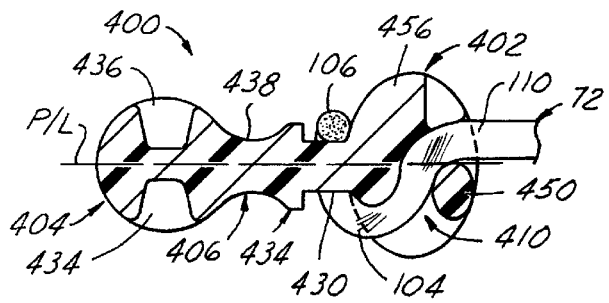

FIG. 44 is a cross-sectional view taken on the line 44—44 of FIG. 43.

Figure 45:
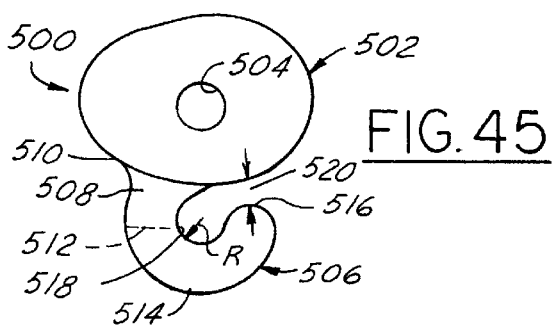
Figure 46:
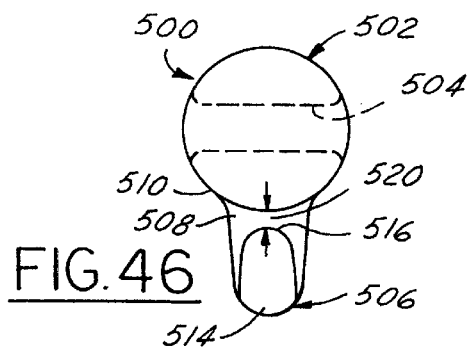

FIGS. 45 and 46 are respectively side elevational and front elevation views of a fifth embodiment anchoring bead of the invention, shown by itself in each view.

Figure 47:
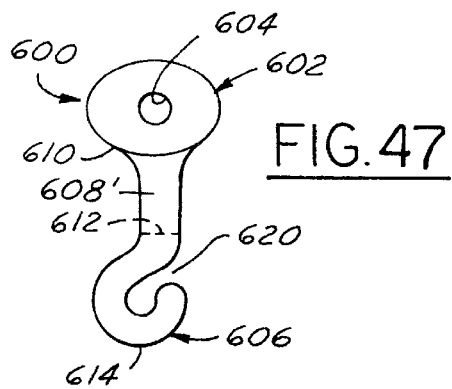

FIG. 47 is a sixth embodiment neck-type anchoring bead of the invention shown in a simplified view by itself.

Figure 48:
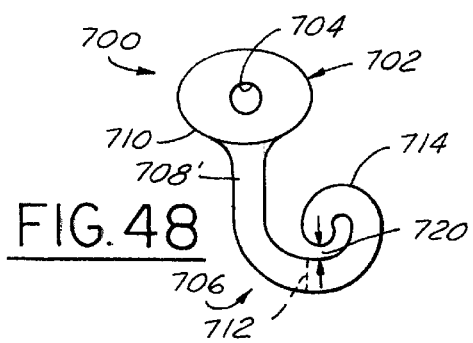

FIG. 48 is a side elevational view in simplified form of a seventh embodiment goose-neck-type anchoring bead also in accordance with the invention.

Figure 49:
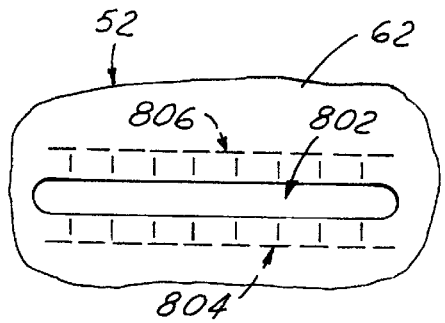

FIG. 49 is a fragmentary elevational view of a horizontally extending non-keyhole type anchoring slot in the seat molding wall as viewed from the front ("show") side of this wall.

Figure 50:
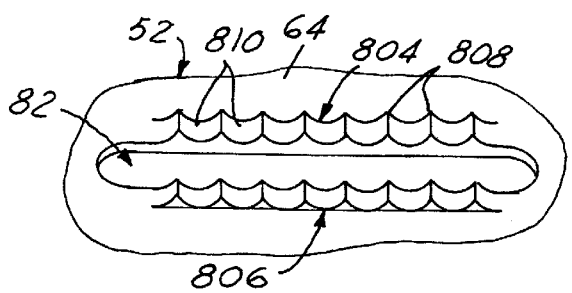

FIG. 50 is a fragmentary perspective view of the anchoring slot structure of FIG. 49 as viewed from the rear ("hidden") side of the seat molding wall.

Figure 51:
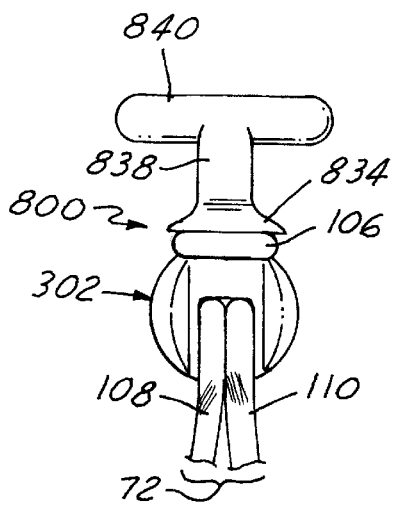

FIG. 51 is a fragmentary plan view of an eighth embodiment neck-type anchoring bead of the invention shown by itself and usable with the anchoring slot structure of FIGS. 49 and 50.

Figure 52:
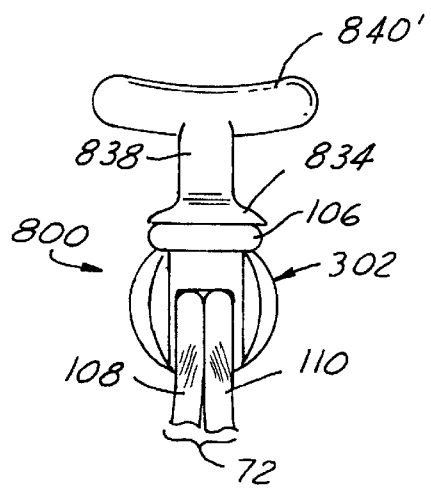

FIG. 52 is a fragmentary plan view of a modification of the eighth embodiment anchoring bead, also shown by itself.

Figure 53:
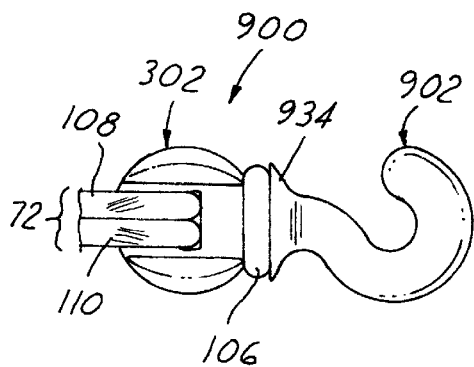
Figure 54:
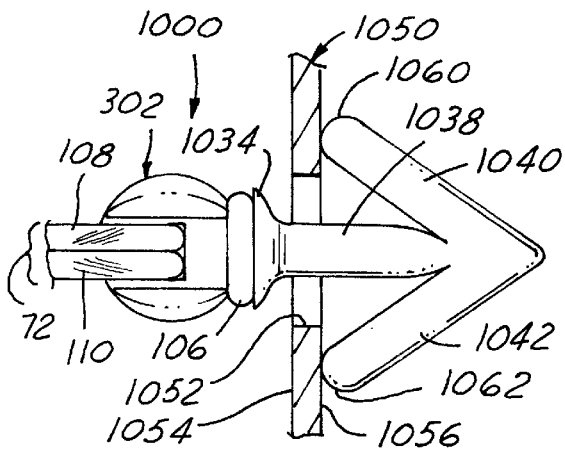

FIG. 53 is a fragmentary plan view of a ninth embodiment neck-type anchoring bead of the invention, shown by itself, and FIG. 54 is a fragmentary plan view of a tenth embodiment anchoring bead of the invention, shown in conjunction with a cooperative anchoring through-hole in a cooperative mounting wall structure.

DETAILED DESCRIPTION OF PREFERRED EMBODIMENTS

FIGS. 1–5 illustrate one exemplary but preferred application of the principles of the cargo retaining receptacle or holder apparatus, associated anchoring bead (applying first and third embodiments thereof) and attachment method of the invention. In FIG. 1 a light cargo utility net receptacle or holder 50 is illustrated as attached for suspension from a molded plastic starboard side wall molding 52 for a vehicle driver side seat and of the type provided in passenger van vehicles of contemporary design and construction. Seat side 52 has mounting holes 54 and 56 for receiving fasteners for attachment to the starboard side of the seat frame, and also has a pair of fore and aft keyhole-type mounting or anchoring slots 58 and 60 respectively that extend between the front or outer surface 62 of side wall 52 and the rear or inner surface 64 thereof. As is typical with keyhole-slot anchors, the wall openings 58 and 60 are each contoured with a larger area opening portion 66 dimensioned large enough to pass an anchor head portion of an anchor therethrough, and a smaller area opening portion 68 forming a narrow slot and dimensioned small enough to block such through-passage of the anchor head portion, but large enough to allow through-passage of a flexible tension element secured to the anchor. The anchor is then held by abutment by the larger anchor portion against the rear wall surface 64 along the margin of the slot 68, with the associated tension element being strung through slot 68.

The margins of slots 68 are preferably provided with rearwardly protruding keeper abutment projections to help restrict upward movement of the anchor bead along the slot margins and thereby forestall unwanted release of anchoring beads 74, 300, 300' back out through the associated large opening portion 66 of keyhole slot openings 58, 60. As shown in FIG. 2 such keeper rear side projections, in the example of keyhole opening 60, may take the form of horizontal ribs 63 and 65 integrally molded with wall 52 and protruding rearwardly from rear wall surface 64, being molded as a single rib and then interrupted by forming slot 68. As shown by way of example in FIGS. 3 and 4, the keeper projections may also take the form of a pair of parallel triangular gusset-like tabs 67 and 69 extending rearwardly from rear wall surface 64 one along each of the margins of slot 68 of keyhole opening 58.

The utility cargo net 50, which is herein exemplary of a variety of cargo holders and receptacles, may comprise a netting of elastic woven stringers 70 arranged, for example, in a rectangular pattern and having an endless flexible tension element in the form of an elastic bungi-type cord 72 strung through the edge loops of the stringers around the four sides of the periphery of holder 50.

In accordance with the invention, an improved form of a first embodiment anchoring beads 74 are shown in FIGS. 1–5 individually attached to the two aft corners of the four corners of the net of holder 50. Third embodiment anchoring beads 300, 300' are shown individually attached to the other two forward corners of the four net corners, as described in more detail hereinafter. In the particular mode of suspension of holder 50 illustrated in FIG. 1, both of the anchoring beads 74 are inserted through the upper large end 66 of aft slot 60 and then caught and retained by the narrower slot 68 of the aft keyhole opening 60. This retention is illustrated with respect to just one of the anchoring beads 74 in the rear side view of FIG. 2. Likewise, both of the third embodiment anchoring beads 300, 300' are inserted in forward keyhole opening 58 in the particular exemplary hook-up of FIG. 1. Again, in the rear side view of FIG. 3 only the lower one 300' of the anchors 300, 300' is visible. The same is true as to the enlargement of anchor 300' at the front side of the wall and forward slot 58 in FIG. 4.

FIRST EMBODIMENT ANCHORING BEAD

Figure 6:
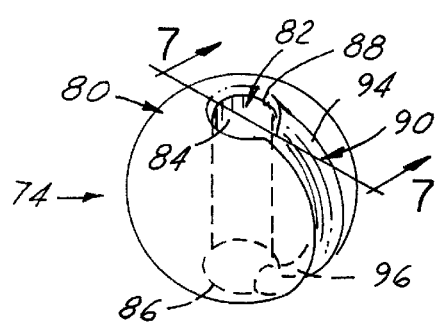
FIG. 6 is a perspective view of the first embodiment anchoring bead construction in accordance with the invention, shown by itself.
Figure 7:
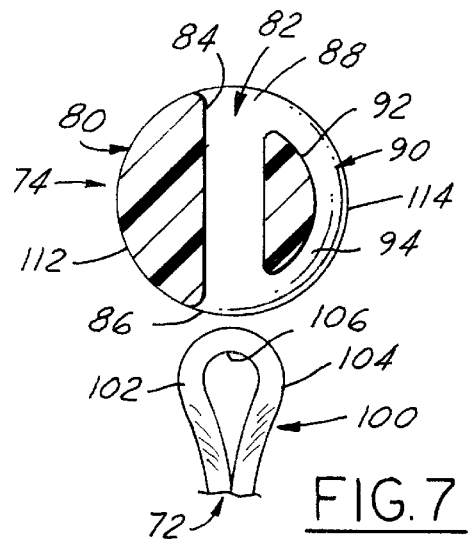
FIG. 7 is a cross-sectional view taken on the line 7—7 of FIG. 6, and with the end loop of a tension element of the cargo receptacle of FIGS. 1 and 5 positioned for insertion into the center passageway of the bead in accordance with the method of the invention.

Referring to FIGS. 6 and 7, the first embodiment anchoring bead 74 is in the form of a solid spherical body 80 having a central through-passageway 82 coaxial with a central axis of body 80 and having a cylindrical wall surface 84 of constant predetermined diameter. Bead 74 thus comprises a spherical block of material 80 having the through-passageway 82 extending between axially opposite loop entrance and loop exit ends 86 and 88 located at opposite end surfaces of body 80 of bead 74.

Bead 74 also has an external groove 90 extending as a semi-circle along a longitudinal line of sphere 80 and opening at its opposite ends to the entrance end 86 and the exit end 88 of passageway 82. Groove 90 is defined by a root surface 92 of constant radial depth and a pair of flanking side walls 94 and 96 extending parallel to one another and spaced apart circumferentially of sphere 80 by a constant predetermined dimension.

Bead 74 is made of any suitable material selected to match the in-use application of the anchoring bead but as shown in the example herein is preferably made as a molded plastic article for homogeneous strength and improved wear resistance as well as economy. When the anchoring beads of the invention are made from molded plastic it is to be understood they can be molded in materials that provide the desired characteristics for varied application requirements such as strength, lubricity or adhesion, flexibility or rigidity, and whatever other characteristics are offered by different engineering resins and polymers. They also can be molded in different colors for styling purposes without affecting structure, function or operation.

METHOD OF AFFIXING FASTENER BEAD TO FLEXIBLE TENSION ELEMENT

Referring first to FIGS. 7–11, and as reiterated in more detail in the corresponding illustrations of the method steps shown in FIGS. 12–26, in accordance with the method of the invention the first embodiment fastener bead 74 may be removably attached to a flexible tension element, e.g., the elastic perimeter bungi cord 72 of net 50, by manually or machine performing the manipulative attachment steps sequentially outlined in FIGS. 7–11. As shown in FIG. 7, the first step is to provide a flexible hanger tension element adapted to be secured to a cargo holder so as to extend therefrom and terminate at a free end in the form of a U-shaped loop 100 made up of the first and second runs 102 and 104 of the perimeter bungi cord 72 interconnected by an end bight 106 of loop 100. As shown in FIG. 7, loop 100 is aligned bight-end-first for entry into the entrance end 86 of passageway 82. The diameter of cylindrical wall 84 defining passageway 82 is made just large enough to accommodate the side-by-side contacting overall lateral of the two runs 102 and 104 when squeezed together. Likewise, the leading end of loop 100 can be compressed to slide snugly through-passageway 82 due to the compressible nature of the elastic perimeter cord 72. In one working example the diameter of each run 102, 104 is 3.2–3.5 mm, and the diameter of passage wall 84 is 3.0 mm for a slight interference fit.

Figure 8:
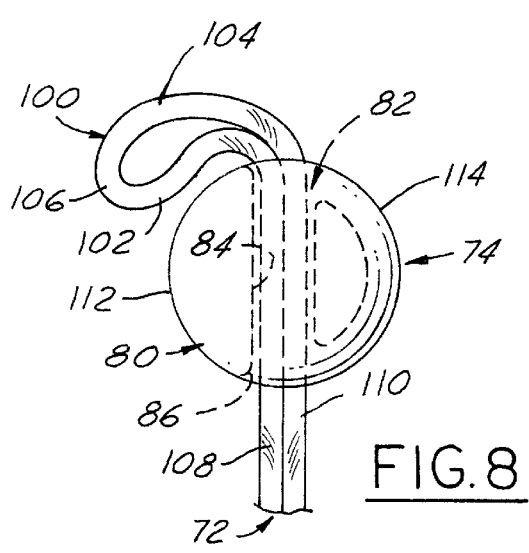

With loop 100 aligned as shown in FIG. 7, the next step is to feed the first and second runs 102 and 204, with loop bight 106 leading, so that the runs extend from the cargo net 50 into the passageway entrance end 86, and thence are fed in side-by-side contacting relationship through the passageway with bight 106 leading, and thence exit out the passageway exit end 88 as shown in FIG. 8. Note that the following trailing portions 108 and 110 of runs 102 and 104 trail back out of the entrance end 86 of passageway 82. Then, as shown in FIG. 9, the exited loop bight 106 and adjacent runs 102 and 104 of the loop 100 are then trained over a hemispherical side surface 112 of body 80 that is disposed diametrically opposite hemispherical side surface 114 of body 80 in which groove 90 is centrally disposed.

Figure 9:
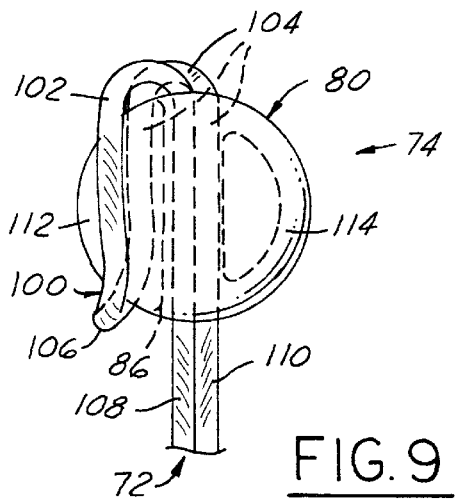
FIGS. 8–11 are side elevational views of the first embodiment anchoring bead (as viewed in FIG. 6) and fragmentary perspective views of the tension element (as viewed in FIG. 1) and sequentially illustrating further steps in the method of the invention.
Figure 10:
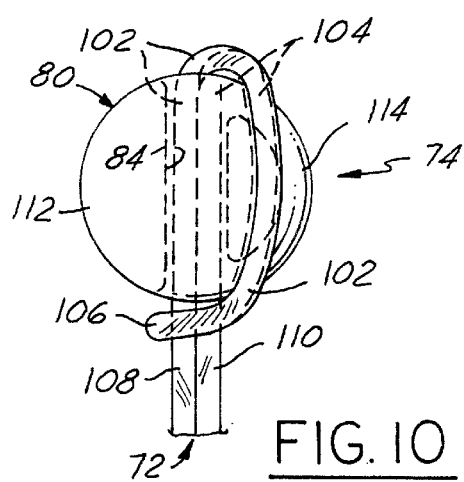

As shown in sequence in FIGS. 9 and 10, as bight 106 is drawn down side 112 toward trailing run portions 108, 110, loop runs 102 and 104 are spread apart by the curvature of hemispherical surface 112 as they are moved from left to right as viewed in FIG. 9 in straddling relation to the bead body 80. As this motion from left to right (as viewed in FIGS. 9 and 10) continues, bight 106 is caught and stopped by engagement with trailing run portions 108, 110 as loop runs 102 and 104 are moved further along the opposite hemispherical surface 114 and now approach each other as they straddle the same.

Figure 11:
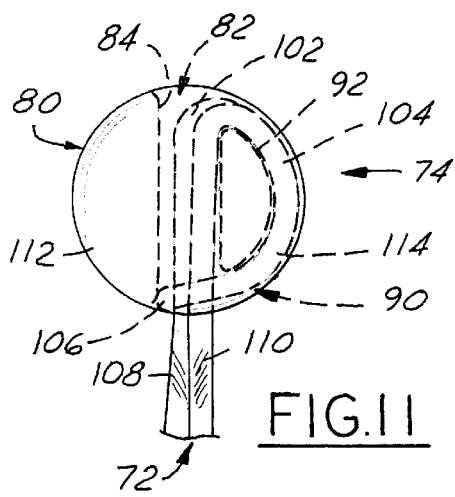
Figure 12:
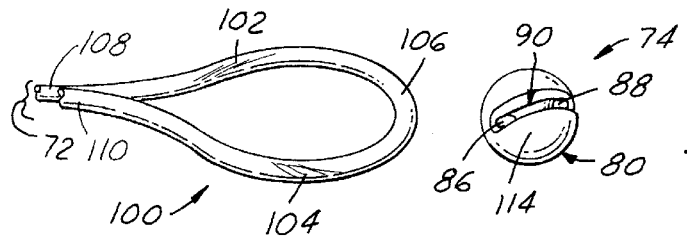
Figure 13:
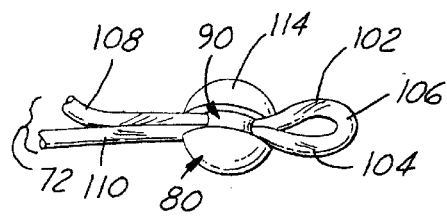
Figure 14:
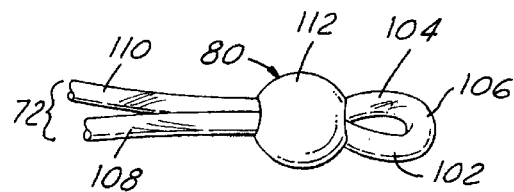
Figure 15:
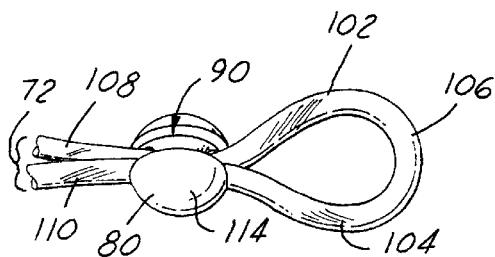

Then, as shown in the progression from FIGS. 10–11, loop runs 102 and 104 are brought together centrally of surface 114 and forced into groove 90. Preferably, the circumferential distance between the side walls 94 and 96 of groove 90 is slightly less than twice the diametrical width of runs 102 and 104 when squeezed side-by-side into the groove to help frictionally retain the runs in the groove in use. Also, the radial depth of groove 90 is slightly greater than the diameter of run 102 or 104 so that the same are recessed below hemispherical side surface 114 when snugged against the groove bottom wall 92 as shown in FIG. 11.

As the final step in the method of affixing fastener bead 74 to the flexible tension element 72, a retrograde tension force is exerted on the trailing run portions 108, 110 while restraining bead body 80 against such force, e.g., pulling trailing run portions 108, 110 downwardly as viewed in FIG. 11, while holding body 80 of bead 74 stationary, or vice versa. This tightens the engagement of bight 106 with trailing run portions 108, 110, thereby stretching the loop bight 106 and loop runs 102 and 104 in tension. Upon release of these tightening forces, bight 106 will be drawn into the entrance end 86 of passageway 82 as shown in FIG. 11 so as to be recessed therein in a final tightened but free state condition of the sub-assembly of tension element 72 and anchoring bead 74. Loop 100 is now releasably retained on bead 74 by snug engagement with bead groove 90 and by catching of loop bight 106 across trailing run portions 108, 110 where they enter passageway 82 to thereby securely but detachably affix bead 74 to the flexible tension element 72 and thus complete one cargo holder hanger sub-assembly 72/74.

In the event it is desired to detach bead 74 from the tension element drawstring 72 for repair or replacement of either bead body 80 or the tension element, the engagement of the tension element as loosened by prying the bight 106 out of passageway entrance 86 so that trailing runs 108, 110 can be fed into passageway 82 to loosen the grip of the tension element on the body 80. This provides slack in the bight runs 102 and 104 where they are snugged into groove 90 so that they can more readily be peeled out of groove 90. The fastening procedure of FIG. 7–11 is then reversed, beginning with FIG. 11 and working back through FIG. 7 in sequence to thereby detach tension element 72 from the body 80 of anchoring bead 74.

Figure 16:
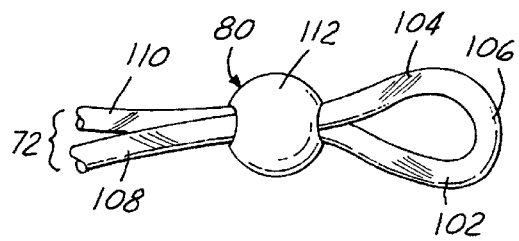
Figure 17:
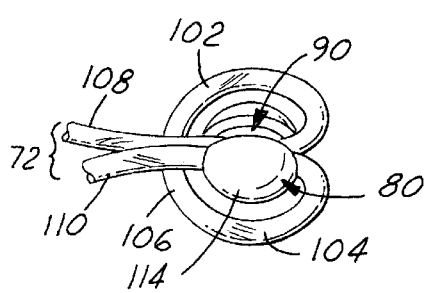
Figure 18:
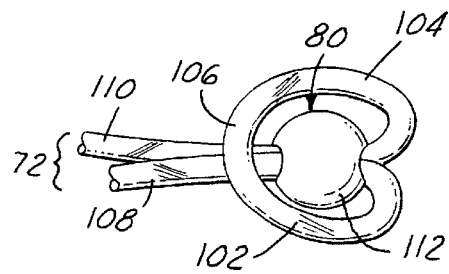
Figure 19:
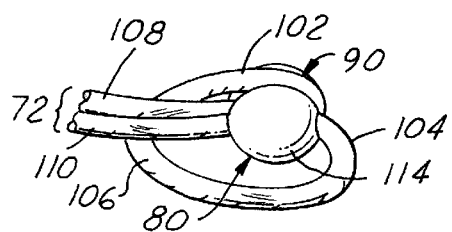
Figure 20:
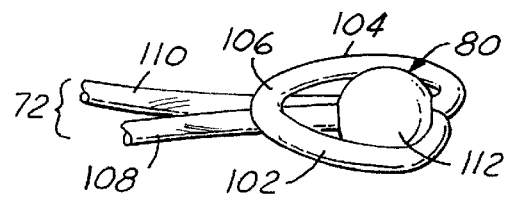
Figure 21:
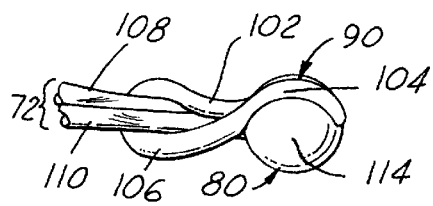
Figure 22:
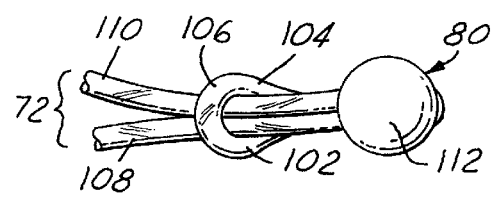
Figure 23:
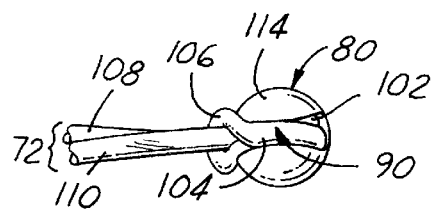
Figure 24:
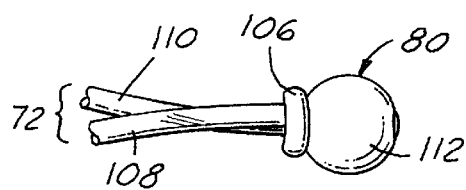
Figure 25:
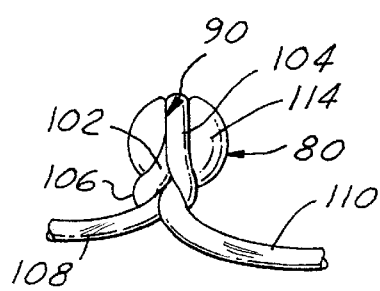
Figure 26:
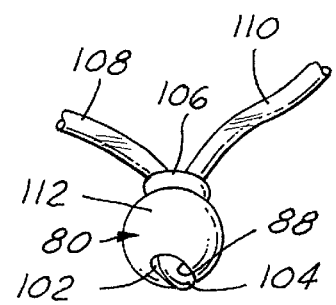

FIGS. 12–26 illustrate sequentially in more detail the foregoing fastening method, and provide views from both sides of bead 80 during the foregoing affixing procedure. Thus, side 114 and groove 90 are visible in FIGS. 13, 15, 17, 19, 21, 23 and 25, whereas the opposite side 112 of bead body 80 appears in FIGS. 14, 16, 18, 22, 24 and 26. The only difference between the sequence of FIGS. 7–11 versus the sequence of FIGS. 13–26 is in the amount of tension element pulled through when bight 106 and loop runs 102 and 104 are exited from the bead passageway 82. As shown in FIG. 16, more of the tension element 72 is pulled through bead body 80 so that, as seen in FIGS. 17 and 18, the loop runs 102, 104 are trained loose and spaced from body 80 rather than being snug thereagainst. This permits, as seen in FIG. 19, loop run 102 to be easily laid into groove 90, and then as seen in FIG. 21, the remaining loop run 104 laid into groove 90 without the need to peel these loop runs 102 and 104 to be over the surface of body 80 as when using the shorter length loop 100 of FIGS. 7–11.

SECOND EMBODIMENT ANCHORING BEAD

FIGS. 27–34 are drawn to engineering scale and illustrate a second and presently preferred embodiment of an anchoring bead 200 also constructed in accordance with the present invention. Anchoring bead 200 is used in the same manner as bead 74 with respect to attachment to flexible tension element 72 or the like for use with a cargo holder or net 50 or the like as described hereinabove However, anchoring bead 200 differs in contour and configuration from bead 74, as will be evident by comparing FIGS. 27–34 with FIGS. 6–11. Anchoring bead 200, rather than having a body 80 that is externally spherically contoured has a body 202 that is a modified spheroid that is externally generally doughnut shaped about a major axis 204 (FIGS. 30 and 33). The doughnut shape of body 202 of bead 200 is defined by a ring-like band of material 206 centered on the major axis 204 and having an exteriorly convex surface 208 that is circumferentially continuous except for a circumferential interruption formed in the convex surface by an external groove 210 corresponding in function to groove 90 of body 80 of bead 74. Groove 210 is thus defined by a pair of circumferentially opposed side surfaces 212 and 214 and a convex root surface 216 configured as shown in FIGS. 27–30.

Body 202 of anchoring bead 200 also has a through-passageway 220 having a longitudinal axis 222 extending parallel to axis 204 and offset laterally therefrom in a direction diametrically away from external groove 210 to thereby increase the amount of material of ring 206 of body 202 provided to form the flanking groove shoulders 224 and 226 on which groove side surfaces 212 and 214 are respectively formed to thereby enable the dimension of the groove in axial and radial directions to be increased and to strengthen shoulders 224, 226 that form groove 210.

It is also to be noted that central passageway 220 has an entrance end 230 and an exit end 232 and a cylindrical interior wall 234 corresponding to the respective entrance, exit and interior wall 86, 88, and 84 of passageway 82 in body 80 of bead 74. However, the entrance and exit ends 230 and 232 of passageway 220 are defined exteriorly of the bead by individually associated surrounding annular margin surfaces 236 and 238 respectively and each recessed from an adjacent exterior surface portion of ring 206. The margin surfaces 236 and 238 merge smoothly with the root surface 216 of groove 210. It will also be seen from FIGS. 27–34 that the ring-like band of material 206 of body 202 varies in its projected dimension axially of body 202, being narrowest axially of the bead at the mid point diametrically opposite groove 210, namely in the plane of section line 33—33. Ring band 206 then gradually increases in axial width as this measurement is moved circumferentially in either direction from this section line to the junction with the groove faces 212 and 214, as will be seen from FIGS. 31 and 32 (respectively taken on the section lines 31—31 and 32—32). This asymmetric construction of bead 200 also increases the radial depth dimension of groove 210 as well as the like dimension of the groove flanking shoulders 212 and 214 to thereby better protect the runs of the tension element when attached to anchoring bead 200.

The flexible tension element 72 is attached to bead 200 in the same manner as outlined in FIGS. 6–11 relative to bead 74, it being understood that passageway 220 and groove 210 are utilized and function in the manner of the corresponding passageway 82 and groove 90 of bead 74. Preferably bead 200 is made as a one-piece injection-molded part with the mold parting line P/L being labeled P/L in FIG. 33. The geometry of bead 200 with the asymmetric configuration of ring band 206 and the recessed margins 236 and 238 at the axially opposite ends of the center passageway 220 cooperate to form "trenches" that receive the tension element cord runs 102, 104, 108, 110 and loop bight 106 and affixed to bead 200 so that the tension element cord is protected by being recessed below the exterior surface dimension of the bead to thereby prevent abrasion of the tension element cords by wall 52. The geometry of bead 200 also makes it easy to mold in that there are minimal variations in cross-sectional thickness as compared to the pure spherical shape of bead 74, while still obtaining spheroid functionality in use, thereby reducing curing time in the mold and thus improving overall production cycle time.

Again, the geometry of bead 200 is also designed to take advantage of the radially compressive properties of flexible tension elements in the form of multi-strand woven cord, and especially with the use of a slightly stretchy or elasticized rubber cord, by adjusting the diameter of the through-passage 220 of the bead so that it is slightly smaller than the relaxed, free state diameter of the cord when laterally doubled (side-by-side) to thereby eliminate involuntary loosening of the attachment knot. Again, the semi-spheroidal geometry of bead 200 enables the bead to bodily swivel or roll/pivot against a restraining surface, as when captured behind the slotted surface as seen in FIG. 2, to thereby better accommodate variable positioning and/or motion of the cargo holder 50 or other product connected by a tension element to the bead. This pivotal characteristic of the anchoring bead also accommodates gravitational positioning of the load with minimal stress to the bead/tension element assembly, as well as swinging or other motion induced by changes in vehicle motion or change in directional load stresses exerted on the cargo holder, as in the case of when the same is constructed for use as a hammock or cargo net or bulk bag for containing granular products.

It will also be seen that with both the first embodiment bead 74 and the second embodiment bead 200, the trailing runs 108, 110 of the tension element 72 cooperate with the entrance end 86 or tube 30 of the central passageway 82 or 220 to function as loop–bight-engagement means that retain the tension element loop 100 via the loop bight 106 thereof by snug engagement with the trailing runs 108, 110 and the passageway entrance to thereby securely but detachably affix the bead to tension element 72.

THIRD EMBODIMENT ANCHORING BEAD

FIGS. 35–41 illustrate a third embodiment 300 of an anchoring bead also constructed in accordance with the invention. Bead 300 is made up of two spheroidal bodies 302 and 304 joined integrally to one another through a neck-like protrusion 306 ("integral" as used herein means joined by being molded in one piece). The neck-like protrusion 306 generally is in the form of or configured as a "goose-neck" having approximately a 90° bend overall. The first spheroidal body 302 is similar in configuration to anchoring bead 200 in having a ring-like band of material 308 of modified spheroidal contour externally and extending about approximately 270° of the circumference of body 302. Likewise, body 302 has a through-passageway 310 having axially opposite entrance and exit ends 312 and 314 defined by recessed marginal surfaces 316 nd 318 respectively. However, through-passageway 310, as best seen in FIGS. 8–41, is of rectangular configuration in cross-section perpendicular to the longitudinal axis of passageway 310. The major transverse dimension of passageway 310 is slightly smaller than the diameter of runs 108, 110 laid side-by-side in the free state condition. The minor transverse dimension of passageway 310 is likewise sized for providing a snug fit for a diametrical dimension of each tension element run portion. The axis of the minor passageway dimension is parallel to that of goose-neck 306 where it joins body 302.

In addition, passageway end margin surfaces 314 and 316, instead of being circular or annular like the margin surfaces 236 and 238 of bead body 202, are flat, parallel to one another and perpendicular to the passageway axis and extend all the way out to the periphery of the ring-like body 308. Each of the recessed surfaces 316, 318 is flanked along its side edges by outwardly divergent side walls 320 and 322, and 324 and 326 respectively, as is best seen in FIG. 39. Moreover, bead 302, instead of having a loop–run retaining groove 90 in a first side surface thereof, has loop–bight engagement means provided in a first portion of goose-neck 306, in the form of a reduced diameter shank portion 330 integrally joined to a flatted surface 332 of the first side surface of bead body 302. The outer end of neck 330 is integrally joined to a second portion of goose-neck 306 that is configured in the form of a collar 334 having a diameter substantially larger than neck 330. Collar 334 defines a radially extending keeper surface 336 facing flatted surface 332 and spaced therefrom by a distance corresponding to slightly less than the diametrical dimension of one of the runs 108 or 110 of tension element 72. Goose-neck 306 includes a third portion made up of a sub-neck portion 338 which has a configuration that forms at least a majority of the goose-neck curvature of the neck protrusion of anchoring bead 300, and is integrally joined at its outer end to the spheroidal wall-anchoring body 304 of bead 300.

Spheroidal body 304 of bead 300 preferably is in the form of a truncated sphere having parallel flat ends 340 and 342 (FIGS. 39 and 40) with axially opposite and coaxial cup-shaped cavities 344 and 346 respectively core-molded therein in order to reduce the amount of material and weight of anchoring bead part 300.

The operation and use of anchoring bead 300 with its attachment to tension element 72 and associated cargo holder 50 is shown in FIGS. 35 and 36. It will be seen that the method of attachment involves forming the loop 100 as in FIG. 7 with the loop runs 102 and 104 joined by the end bight 106. Loop 100 is fed bight-end-first into the entrance end 312 of passageway 310 and, thence out the exit end 314. This feed through is continued to draw a sufficient extent of the leading end loop further out through bead body 302 until the loop with bight 106 is long enough to be looped over bead body 304. Next, bight 106 is inserted into the retaining groove formed between collar 334 and bead body 308. Then anchoring bead 300 is held while retrograde tension is exerted on following runs 108, 110 of tension element 72 to thereby snug up the bead engagement of bight 106 and runs 102, 104 to complete the removable attachment of anchoring bead 300 to tension element 72 and hence cargo holder 50. Again, the size of passageway 310 as well as the groove between collar 334 and flat 332 of body 308 assist in frictional retention of the knotted tension element to bead 300.

As will be seen from FIGS. 1, 3 and 4, when lower forward anchoring bead 300' is thus secured to holder 50, only the retaining spheroid body 304 is inserted through the larger opening 66 of keyhole slot 58 in the supporting wall 52. The adjacent portion of goose-neck arm 338 is aligned above the narrower portion 68 of slot 58 and then anchoring bead 300' is dropped down to slide goose-neck 306 down in narrow portion of slot 68. The margins of slot 68 of the rear surface 64 of wall 52 serve to retain bead body 304 from passing through the narrow portion of the slot 68. This completes a hook-up of tension element 72 via bead body 302 and goose-neck 306 with anchoring or retaining body 304 of anchoring bead 300'. Thus the frictional engagement between anchor bead 300 or 300' occurs only on the wall margins of slot 68 and is limited to the goose-neck 306 and/or retaining spheroid body 304. Hence the material of the tension element 72 in both runs 108 and 110, as well as loop runs 104 and 102 and loop bight 106, are held isolated or spaced away from the front surface 62 of wall 52. This spacing is maintained even during swiveling and pivoting of the anchor 300' in use as the position of cargo holder 50 shifts as it is suspended in a vehicle, or similar motion caused by any other similar forces affecting the attachment angle of tension element 72 relative to wall 52.

FOURTH EMBODIMENT NECK-TYPE ANCHORING BEAD

FIGS. 42, 43 and 44 illustrate a fourth embodiment 400 of a neck-protrusion-type anchoring bead wherein those elements similar in function to corresponding elements of the third embodiment anchoring bead 300 are given a like reference numeral raised by a factor of 100, their description not being repeated in detail since the structure and function of the elements of anchor 400 will be apparent from the description of anchor 300 as well as from the drawings FIGS. 42, 43 and 44, which are incorporated herein by reference. The primary differences between anchor 400 and 300 are in the fact that the neck portion 404, 406 is arranged as a coaxial, linear array of retaining collar 434, sub-neck 438 and anchoring bead body 404, instead of having a goose-neck-like curvature.

The second difference is in the formation of the through-passageway 410 in bead body 402 of anchor 400. It is seen that passage 410 is formed somewhat like an S-curve as defined between a strut portion 450 extending between solid spheroidal ends 452 and 454 of body 402 spaced from a larger strut portion 456. Passageway 410 is primarily defined between the juxtaposed cooperate passage-forming surfaces of struts 450 and 456. It will be seen that the cavity portion of bead body 402 defining the passageway is formed by mold parts (not shown) meeting at the parting line P/L without the need for any movable cores or slides in the mold construction, the same being true for forming the material void portions 434 and 436 in retaining bead 404 of anchor 400.

The stringing and attaching of tension element 72 is quite similar to that involved with attaching tension element 72 to anchor 300, as described previously, and as will be apparent from an examination of FIGS. 43 and 44.

Anchor 400 is particularly advantageous for use in those applications where the tension force of the holder in use will generally be exerted along a line of force directed perpendicularly to the major plane of the support wall 52, as when stringing a net between vehicle floor and ceiling anchor slots or from side to side across the vehicle cargo bay between vertical interior bay side walls.

FIFTH EMBODIMENT ANCHORING BEAD

FIGS. 45 and 46 illustrate a fifth embodiment 500 of an anchoring bead of the invention for use with a tension element of a radially compressive nature, such as a resiliently elongatable plastic or rubber cord, braided synthetic multi-strand rope and the like. Anchoring bead 500 has a spherical body 502 as presented by its exterior configuration, and a weight and material reducing passageway 504 extending completely therethrough. Anchoring bead 500 also has a radially outwardly extending protrusion 506 made up of a first shank portion 508 integrally joined at its radially inner end to a first side surface 510 of bead body 502 and extending generally radially outwardly therefrom to a second end 512 (indicated schematically by the broken line 512 in FIG. 45). Protrusion 506 also has a second hook-eye portion 514 having a first end integrally joined to the shank portion second end 512 and a second end 516 in the form of a free-end rounded or bullet-nose terminus of the hook-eye portion 514. As shown in FIG. 45, hook-eye portion 514 has a re-entrant curvature relative to body 502 with a predetermined radius of curvature R of its inside radius surface 518 slightly smaller than the radius dimension of the plastic cord tension element (e.g., one run of element 72) when the same as in an unstretched, free-state (relaxed) condition. Hook-eye free end terminus 516 defines a gap 520 with the bead block first side surface 510 providing an opening dimension at its narrowest region only slightly larger than the minimum diameter of the aforementioned elastic cord tension element (e.g., run 108 of tension element 72) when stretched substantially to its working elastic stress limit.

Anchoring bead 500 is assembled to a flexible tension element, such as elastic cord 72, by forming the loop 100 (FIG. 7) with the runs 102 and 104 and connecting bight 106, runs 102 and 104 either being joined or unjoined to one another depending upon the application. The loop 100 is then hooked over the hook-eye protrusion 506 to detachably secure tension element 72 to anchoring bead 500. This is done by urging the bight 106 forcibly through gap 520, thereby radially compressing the material of bight 106 until it is forced into the interior of the hook-eye portion 514 where it has a snug fit with eye interior surface 518.

Anchoring bead 500 with cord 72 so attached is then hooked to an anchor keyhole-slot, such as slot 58 or 60, in a supporting structure, such as seat side wall molding 52, in the manner of anchoring bead 74 or 300. As so hooked, the spheroidal exterior surface of bead body 502 bears against the rear wall surface 62 of support wall 52, and the shank portion 508 extends through the narrow portion 68 of slot 58 and the hook-eye portion 514 is disposed out in front of front wall surface 62 of wall 52. Tension element 72 extends in hooked relation from hook-eye 514, usually under tension stress, to whatever object it may be attached to, such as the cargo holder or net 50. The spheroidal surface of bead body 502 bearing against the margins of slot 68 in rear wall surface 64 of wall 52 enables the anchoring bead 500 to pivot bodily about its own axis in response to changes in the direction of the pull force being exerted on protrusion 506 by tension element 72. This reduces bending stresses otherwise expected to be imposed on tension element 72. However, bight 106 of loop 100 in use is not normally pulled by a force exerted in a direction tending to withdraw it through gap 520. Hence inadvertent or accidental unhooking of the tension element from bead 500 does not normally occur.

When it is desired to intentionally detach tension element 72 from bead 500, the bead 500 is held in one hand and the tension element pulled in a direction tangential to surface 510 and through gap 520 so that bight 100 is forced through the gap by the magnitude and orientation of this pull-out force. If the tension element is made of relatively readily incompressible material the same type of attachment and release action can be obtained by constructing body 502 and the protrusion 506 integrally of a strong but semi-resilient material. Hook-eye portion 514 then acts as a spring finger to enable gap 510 to be sprung open to permit passage of bight 106 of the tension element during fastening and unfastening of the same in accordance with the foregoing procedural steps.

SIXTH EMBODIMENT ANCHORING BEAD

FIG. 47 illustrates in simplified form and side elevation a sixth embodiment anchoring bead 600 wherein elements alike to those of anchoring bead 500 are given a similar reference numeral raised by a factor of 100 and their description not repeated. The only exemplary difference between anchoring bead 600 and 500 is in the length of the shank portion 608' as compared to shank 508. Shank 608' extends generally linearly between the first end thereof attached integrally to bead surface 610 and the second end 612 thereof joined to hook-eye portion 614 at junction 612. Anchoring bead 600 is attached to a flexible tension element in the same manner as anchoring bead 500 as described previously, and likewise as to detachment of the tension element from anchoring bead 600. Also, anchoring bead 600 with the attached tension element is connected and attached to a support wall 52 in the same manner described previously with respect to bead 500.

SEVENTH EMBODIMENT ANCHORING BEAD

FIG. 48 illustrates in simplified form a seventh embodiment anchoring bead 700 wherein, again, elements alike to those of bead 500 are given like reference numeral raised by a factor of 200 and their description not repeated. Anchoring bead 700 differs from anchoring bead 600 in that the first shank portion 708' of neck protrusion 706 is made longer than shank portion 608' and provided with an axial curvature prior to its junction 712 at its second end with the hook-eye portion 714. Protrusion 706 in general thus has a goose-neck configuration terminating in a hook-eye 714. With this geometry of the anchoring bead, tension element 72 is attached in the same fashion as described previously in conjunction with anchoring beads 600 and 500, and likewise as to attachment to and detachment from supporting keyhole anchoring slot 58 or 60 of the wall 52 of the supporting structure.

However, by making the hook-eye in a goose-neck configuration in which the direction of re-entrant curvature of the hook-eye portion 714 is the same as the direction of axial curvature of the goose-neck portion of shank 708', there is less likelihood of unintentional release of loop 100 of the attached tension element via gap 720 of hook-eye portion 714. This feature of anchor bead 700 also provides "bumper" protection for the tension element when the pull force exerted by the tension element 72 pivots the anchoring bead 700 in use so as to bring the end of hook-eye 714 into abutment with the exterior surface 62 of wall 52.

Again, hook-eye bead 700 may be made of an inflexible material such as high strength metal or thermo–set resin when used with a radially compressible tension element that is sufficiently radially compressible to be squeezable through the gap 720 of hook-eye 714. When a radially incompressible tension element is employed, eye 714 as well as the remainder of anchoring bead 700 can be made of semi-resilient material so that hook-eye portion 714 operates as a spring catch.

EIGHTH EMBODIMENT ANCHORING BEAD AND ANCHORING SLOT STRUCTURE

FIGS. 49, 50 and 51 illustrate an eighth embodiment 800 of an anchoring bead (FIG. 51) intended for use with a modified non-keyhole-type anchoring slot 802 shown in FIGS. 49 and 50. Slot 802 may extend horizontally in seat molding wall 52 and have a constant transverse width dimension (vertical opening dimension as viewed in FIG. 49) generally similar to the width dimension of the narrow slot opening 68 of keyhole openings 58, 60. The longitudinal or lengthwise dimension of slot 802 may vary widely, and may be eight or ten times the magnitude of the transverse dimension as shown by way of example in FIGS. 49 and 50.

As shown in FIG. 50 the "hidden" or rear side surface 64 of seat wall 52, which is the face opposite to the front or "show" side surface 62 of wall 52, is provided with two parallel rows 804 and 806 of rearwardly protruding teeth 808 with their peaks alternating with concave root surfaces 810 and being aligned transversely row–to–row on the opposite margin sides of slot 802.

Anchoring bead 800, as shown in FIG. 51, utilizes the spheroidal body 302 of the third embodiment anchoring bead 300, and likewise has a reduced diameter shank portion (hidden from view in FIG. 51) around which the bight 106 of loop 100 is trained in the manner of removably fastening the same to the reduced diameter shank portion 330 of anchoring bead 300. Anchoring bead 800 also has an integral collar 834 defining a radially extending keeper surface similar to surface 336 of the third embodiment anchoring bead 300. Anchoring bead 800 also has a sub-neck portion 838 extending radially from bead portion 302 and having a round cross-section with a diameter slightly less than the transverse dismension of slot 802. The outer end of sub-neck 838 is integrally joined to a cross-bar portion 840 having a cylindrical outer surface and a longitudinal axis oriented perpendicular to that of sub-neck shank 838. The axial dimension of cross-bar 840 preferably is approximately four times the transverse dimension of slot 802.

As is evident from FIG. 51, cross-bar 840 forms with sub-neck 838 a "Tee-head" that cooperates in use with slot 802 to removably connect a tension element 72 to wall 52. Anchoring bead 800 is first removably attached to tension element 72 in the same manner as described in conjunction with, for example, the third embodiment anchoring bead 300. With tension element 72 thus removably attached and carried on anchoring bead 800, the same may be attached to wall 52 utilizing the anchoring slot structure 802–810 by inserting the anchoring bead Tee-head first with cross-bar 840 aligned parallel to the longitudinal axis of slot 802 as shown in the relationship of FIG. 51 to FIG. 49. Cross-bar 840 is inserted completely through slot 802 and out past rear surface 64 until the cross-bar is disposed just clear of the peaks of the teeth of rows 804 and 806. Then anchoring bead 800 is rotated about the axis of sub-neck 838 a quarter turn (90°) so that the longitudinal axis of cross-bar 840 extends perpendicular to the longitudinal axis of slot 802. Then, with tension of a load being exerted on tension element 72, when anchoring bead 800 is released, cross-arm 840 will be pulled into seating engagement with a selected transversely aligned pair of concave root surfaces 860 of teeth 808 in teeth rows 804 and 806, i.e., one arm of cross-arm 840 seating on the selected tooth root 810 of row 804 and the other arm on the transversely aligned root 810 of row 806. Thus pull-tension exerted on tension element 72 holds anchoring bead 800 in a selected position as restrained by such tooth engagement from motion along the longitudinal axis of slot 802, and as also restrained against rotation out of such transverse orientation of cross-arm 840 relative to slot 802.

To release anchoring bead 800 from hooked engagement with the anchoring slot structure 802–810, body 302 is gripped and pushed toward the front surface 62 of wall 52 to further insert sub-neck 838 through slot 802 and thus move cross-bar 840 rearwardly out of engagement with tooth rows 804, 806. Then with cross-bar 840 thus held free of teeth rows 804, 806, bead 800 is rotated 90° about the axis of sub-neck 838 to thereby align the longitudinal axis of cross-arm 840 parallel with the longitudinal axis of slot 802, and cross-arm then pulled back out through slot 802, thus freeing bead 800 from wall 52.

FIG. 52 illustrates a slight modified form 800' of anchoring bead 800 wherein the only difference is in the shape of the cross-arm 840' such that it is given a uniform curvature along its longitudinal axis generally as shown in FIG. 52, the curvature being in the plane of the drawing only. Modified anchoring bead 800' may be used in the same manner as bead 800 in conjunction with anchoring slot structure 802–810. The curvature of cross-arm 840' cooperates with the teeth of tooth rows 804 and 806 and augments their effect in restraining rotation of anchoring bead 800' about the axis of sub-neck 838 when tension element 72 is under load and tending to seat cross-arm 840' in the selected paired teeth roots of the tooth rows.

NINTH EMBODIMENT ANCHORING BEAD

FIG. 53 illustrates a ninth embodiment 900 of an anchoring bead of the invention that utilizes the spheroidal body 302 of the third embodiment 300 anchoring bead along with a similar collar 934 for retaining loop bight 106 as well as protecting the same from chafe in use. Anchoring bead 900 differs from the prior embodiments in that its neck protrusion is made in the form of a hook 902 standard hook configuration. Tension element 72 is removably loop-lassoed coupled to anchoring bead 900 in the same fashion as described previously in conjunction with anchoring bead 300 to thereby provide a convenient, reliable and economical means for attaching tension element 72 when formed into the bead attachment loop 100 as described previously. Anchoring bead 900 is particularly useful as a bead hook for use on bungi nets that are going to be hooked to various wire or rod elements such as found on motorcycles and van roof racks or to be hung from pipes or rods in storage areas such as closets, garages, etc.

It is to be understood that due to the function of anchoring beads 800, 800' and 900, the same may be made in a variety of rigid or elastomeric materials ,and may be die-cast in metallic materials or injection-molded in plastic materials, depending upon the desired or intended use and application.

TENTH EMBODIMENT ANCHORING BEAD

FIG. 54 illustrates a tenth embodiment 1000 anchoring bead also in accordance with the invention. Bead 1000 also utilizes spheroidal body 302 and associated shank and retaining collar 1034 for removably securing tension element anchoring loop 100 to the anchoring bead structure in the manner of bead 300 described previously hereinabove. The sub-neck portion 1038 of bead 1000 is circular in cross-section and tapers down from the retaining collar 1034 to a shank portion that terminates in a pair of spring arms 1040 and 1042. Arms 1040 and 1042 are integrally joined to the distal end of shank 1038 to form an arrow-head-like configuration in the plane of the drawing of FIG. 54, with arms 1040 and 1042 inclined backwardly and divergently at an acute angle with the axis of sub-neck 1038.

Anchoring bead 1000 is intended for use with an anchoring wall structure wherein a wall 1050 is provided with a through-hole 1052 extending from the show or front side wall surface 1054 to the hidden or rear wall surface 1056 of wall 1050. The diameter of opening 1052 preferably is generally equal to the fully collapsed maximum outside dimension of arms 1040 and 1042 when yieldably flexed to be pressed flat against shank 1038. In the free state condition of spring arms or fingers 1040 and 1042 their rear tips 1060 and 1062 are spaced from one another by a dimension (in the plane of the drawing as illustrated in FIG. 54) a distance of say approximately twice the diameter of opening 1052.

Anchoring bead 1000 is designed for semi-permanent attachment of the tension element 72 to a wall anchoring structure 1050. Hole 1052 may be a pre-existing opening in wall 1050 or may be a simple hole drilled in a panel utilizing a drill bit size coordinated with the dimensions of anchoring bead 1000, or vice versa. To attach tension element 72 to wall 1050, anchoring bead is inserted from the show side 1054 with its arrow-head axially aligned with the axis of hole 1050 and inserted therethrough. The wall margin of hole 1052 riding on the outer edges of spring arms 1040 and 1042 cams the resilient arms tight against sub-neck 1038 to enable passage of the arrow-head configuration through opening 1052. Once arm free end tips 1060 and 1062 clear the back edge surface 1056 of wall 1050, arms 1040 and 1042 spring apart to their free state configuration shown in FIG. 54, which provides a blocking tang relationship of tips 1060 and 1062 with wall rear surface 1056, thus preventing pull-back loosening of anchoring bead 1000 from the wall. The diameter of retainer collar 1034 is greater than that of opening 1052 so that the extent of insertion of anchoring bead 100 into wall 1050 is limited as stopped by abutment of collar 1034 with the outer edge margin of hole 1052 in wall front surface 1054.

If access is available to the rear face 1056 of wall 1050, anchoring bead 1000 can be removed by squeezing spring fingers 1040, 1042 together and pushing the same back through hole 1052 until the arrow-head portion of anchoring bead 1000 is free of engagement with wall 1050. However, if hole 1052 is in the nature of a "blind hole" with no access to the rear surface 1056 of wall 1050, then foregoing installation of anchoring bead 100 renders the same a permanent hook-up of tension element 72 to wall 1050, i.e., anchoring bead 1000 would have to be destroyed by severing shank 1038 in order to release tension element 72 and bead 302 from the hook-up to wall panel 1050.

FURTHER FEATURES AND ADVANTAGES

From the foregoing description it will now be evident to those skilled in the art that the anchoring bead fastener of the invention, both alone and in combination with a flexible hanger tension element, and also with an associated cargo holder or receptacle, amply fulfills the aforestated objects and offers many features and advantages over the prior art. All forms of the anchor bead in its various embodiments described hereinabove may be economically molded of plastic materials for homogeneous strength and improved wear resistance.

The embodiments of anchoring beads provided with neck protrusions, i.e., embodiments 300–700, are advantageous where the flexible tension element, when made of fabric covered bungi cord, an elastic elastopolymer, and even woven cable and wire, may be subjected to wear by abrasion on the supporting structure and possible failure due to such frictional end wear. By supporting loop 100 spaced away from support wall 52 the primary engagement contact between the supporting wall 52 and the anchoring bead 300, 400, 500, 600, 700 occurs on the spheroidal bead portion and associated neck protrusion that in use extends through the slot 68 of the keyhole anchoring attachment.

The first and second embodiment anchoring beads 74 and 200 represent the simplest form of the anchoring bead and can be produced at least cost and weight/volume of material. The method of attaching the tension element 72 to beads 74 or 200 as described in conjunction with FIGS. 6–26 is simple but very reliable in use and operation. The same is also true regarding attaching the tension element 72 to the remaining embodiments of anchoring beads 300–700.

The knotted bead geometry in embodiments 74, 200, 300, 400 provides in effect, recessed "trenches" to accommodate the tension cord runs and loop bight so that the cord is protected by being recessed below the exterior surface dimensions of the associated anchoring bead. Preferably these recessed protection trenches are positioned wherever possible or necessary to protect the tension element cord.

The bead geometries of anchoring beads 74, 200–700 are also designed in a way that makes it easy to mold in that there are minimal variations in cross-sectional thicknesses, thereby reducing curing time in the mold and thus improving overall production cycle time. The geometry of the anchoring beads is also designed to take advantage of the compressive properties of elastic or semi-elastic tension elements, and particularly that type that has a slightly stretched or elasticized cord that varies in diametrical dimension according to tension stress exerted on the same. The interior passageways for feeding the tension element runs are predetermined in size so that they are slightly smaller than the relaxed or free states sizes of such elastic cords to thereby frictionally assist in preventing involuntary loosening of the attachment knot or hook-on configuration of the tension element attachment loop, and tend to be self-tightening under a load.

Since the various embodiments of the anchoring beads of the invention are preferably made by molding a plastic material, they can be molded from a wide range of plastic materials selected to provide the desired characteristics for a given application, such as meeting varying requirements of strength, lubricity or adhesion, flexibility or rigidity, and whatever other physical and/or chemical characteristics are offered by the particular engineering resin or polymer selected for a given application. The anchoring beads can also be molded in different colors to accommodate styling harmonization without affecting structure, function or operation.

In those embodiments of anchoring beads having a neck-like protrusion, i.e., anchoring beads 300–700, the length of the neck and related geometry can be changed or varied to accommodate variations in thickness of the anchor support material, such as the thickness of wall 52 having the anchoring slot 58, 60, in order to properly receive and seat the retaining spheroid of the anchoring bead.

It will also be appreciated that the anchoring beads can be used for a variety of purposes and made in a variety of materials and sizes so that they can be attached to the end of cords or other flexible tension elements used for positioning and/or retaining a wide variety of cargo holders or receptacles, such as cargo nets, hammocks, grocery or produce containers, fishing nets, shipping restraints, trash bags, safety nets or any other similar type products which use a flexible tension element draw string and/or hanger cord, and that could similarly benefit from the features and advantages of the present invention.

In certain applications the neck protrusion of the anchoring bead is designed to fit snugly rather than loosely into narrow slot 68 of the anchoring keyhole 58, 60. When so designed, additional operational advantages of anti-vibration, noise reduction, resistance to dislodgement or any other related characteristic can be obtained by such snug fit relationship between the two mating parts. In these snug-fit applications the choice of material for construction of the anchoring bead is preferably among those plastic materials offering more compressive characteristics, i.e., rubbery, as well as offering self-lubricating properties.

The pivotal functional characteristic of the anchoring beads when slot-anchored results from their spheroidal surface bearing characteristic on the rear wall surface 64 of the support wall 52. This feature allows the suspended net 50 or other product connected to the anchoring bead to be randomly positioned by hanging by gravity from the cord attached either directly to the bead or from the neck protrusion of the bead. This freedom to pivotally accommodate gravitational positioning of the load reduces fastening stresses on the anchoring bead as well as on the anchoring bight 106 of the tension element. This feature also reduces wear due to "working" of the tension element surface relative to and on the bead surface where the two are engaged in response to motion or other re-positioning forces exerted on a load carried in a hammock or cargo net.

It will also be understood that the pivotal feature provided by the method of fastening in accordance with the invention enables the anchoring beads to be used as gripping beads attached to drawstrings in flexible receptacles so that the same can be manipulated more readily, and also to prevent the drawstrings from retracting too far back into the drawstring tunnels of the associated sack or bag. The beads can also be useful in providing several points of support attachment for a given load-carrying receptacle, thereby reducing peak stresses between the tension element and the sack or receptacle.

A single anchoring keyhole opening can be used with a long narrow slot that will receive several beads from a given sack or from different sacks to thereby render the application more versatile. Likewise, the anchoring slot can be oriented horizontally or diagonally to the vertical to accommodate many beads and thereby allow increased package placement and cargo positioning options. For example, the end of such a bead anchoring sidewall slot extending to the back of a tractor–trailer could be employed, and the larger entry opening blocked to stop the anchoring beads from falling out of the access end of the slot. The slot could also be curved through a 90° or other angle, or otherwise turning it upward, so the large hole area of the slot would be disposed at a higher elevation and hence the product would tend to be self-retaining on the support structure under the forces of gravity.

The disclosed method of using the anchoring bead fasteners and attaching a tension element for retention or positioning thereof is simple and can be performed by any average worker with minimal instruction and without the use of any tools. The pivoting characteristic of the anchoring bead allows maximization of space utilization without the need for calculating a positional limitation relative to the placement of the load suspended from the bead. The anchoring bead can be installed and removed easily and quickly, both with respect to its connection to the flexible tension element to provide the sub-assembly of bead and tension element and to connection of this sub-assembly to the keyhole anchoring slot, in a variety of adverse conditions, such as in the dark, under water, while under duress or even in an emergency condition. No metal fasteners are required to make very strong attachments. The anchoring bead, if made of non-metallic material, can provide the advantages of being non-corrosive and non-degrading relative to chemical attack from solvents and the like. The anchoring beads are easily attached to existing products by using only a small section length of the existing tension element provided with the product in order to make the loop 100 for the attachment knot.

The keyhole slot anchoring structure in the supporting wall is easily formed during initial manufacture, and even when retrofitting can be readily provided by drilling a clearance hole and milling a slot to form the anchoring keyhole structure to receive the installation of the anchoring beads and associated tension elements of the invention. In use, the anchoring bead provides a silent and squeak-free attachment even during repetitive motion of the load relative to the anchoring structure. The method of fastening and attaching a tension element to the anchoring bead in accordance with the invention creates a union therebetween which is at least as strong as the tension element itself, unlike other methods of fastening which can unsnap or work themselves during operation.

All of the anchoring bead designs and embodiments of the invention provide a product or part of simple geometry which is easy to assemble to the attachment support structure, and therefore less costly to manufacture and use. These anchor bead fasteners are also inexpensive to produce in a number of functional plastics, including one of the least expensive of all plastics, namely recycled polypropylene. In addition, the plastic injection molding tooling or molds for making the various embodiments of anchoring beads as disclosed have flat parting lines. Therefore, the molds are less costly to build, require less maintenance and can operate in quicker cycle times as compared to the molding of fasteners which require contoured parting lines and/or mechanical slides to release the molded part due to non-draw geometric conditions in the part configuration relative to the separable mold parts.

What is claimed is:

1. A cargo retaining receptacle comprising in combination at least one flexible hanger tension element secured to said receptacle and extending therefrom and terminating at a free end in the form of a U-shaped loop made up of first and second runs interconnected by an end bight, and a hanger anchoring bead fastener releasably attached to said hanger element at said free end thereof, said bead fastener comprising a block of material defining a bead and having a through-passageway defining axially opposite loop-entrance and loop-exit ends thereof located respectively at first and second opposite end surfaces of said bead, said bead further having loop-bight-engagement means disposed on a first side surface of said bead and aligned at least partially between said passageway axially opposite ends and receiving said runs of said loop extending from said receptacle into said passageway entrance end and thence in side-by-side contacting relationship through said passageway and thence out said passageway exit end such that said loop and bight are releasably retained on said bead by snug engagement with said bead loop-bight-engagement means to thereby securely but detachably affix said bead to said hanger element of said receptacle.

2. The combination of claim 1 wherein said bead loop-bight-engagement means includes an external groove in said first side surface of said bead for retaining a portion of each said first and second runs of said loop disposed exteriorly of said bead passageway and in side-by-side contacting relationship as they exit said passageway exit end and as they lead to said loop bight when said loop bight is in said snug engagement with said loop-bight-engagement means.

3. The combination of claim 1 wherein said loop-bight-engagement means comprises a bight-retaining portion of each of said first and second runs of said tension element disposed exteriorly of said bead and immediately adjacent and leading into said passageway entrance end, said loop bight traversing said bight-retaining portions of said runs on the side thereof remote from said bead first side.

4. The combination of claim 3 wherein said bead loop-bight-engagement means includes an external groove in said first side surface of said bead for retaining an exited portion of each said first and second runs of said loop disposed exteriorly of said bead passageway and in side-by-side contacting relationship as they exit said passageway exit end and as they lead to said loop bight when said loop bight is in said snug engagement with said loop-bight-engagement means.

5. The combination of claim 4 wherein said bead block of material is externally generally spherically contoured.

6. The combination of claim 4 wherein said bead block of material is externally generally doughnut shaped about a major axis and the longitudinal axis of said through-passageway is oriented generally parallel to the major axis of said doughnut shape of said bead block.

7. The combination of claim 6 wherein said entrance and exits ends of said passageway are defined exteriorly of said bead by individually associated surrounding margin surfaces each recessed from an adjacent exterior surface portion of said bead and merging with a root surface of said groove in said bead first side surface.

8. The combination of claim 7 wherein said doughnut shape of said bead is defined by a ring-like band of material centered on said major axis and having an exteriorly convex surface encircling said through-passageway except for an interruption formed in said convex surface by said external groove.

9. The combination of claim 8 wherein said convex surface varies in width and is widest adjacent said external groove to provide flanking shoulders along said groove to assist in retaining said exited portion of said runs disposed in said external groove.

10. The combination of claim 9 wherein said passageway longitudinal axis is offset laterally from said major axis of said ring-like band of material with said offset being in a direction diametrically away from said external groove to thereby increase the amount of ring material forming said flanking groove shoulders of said bead and thereby strengthening said shoulders.

11. The combination of claim 1 wherein said loop-bight-engagement means of said bead comprises a neck-like protrusion extending radially outwardly from the exterior of said first side surface of said bead, said loop end bight being hooked over and thereby trained around said protrusion on the side thereof remote from said through-passageway exit end.

12. The combination of claim 11 wherein said neck-like protrusion comprises first and second portions formed integrally end-to-end, said first portion being integrally joined at one end to said bead at said first surface and having a shank of a reduced cross-sectional dimension around which said tension element loop end bight is trained, said second portion having a substantially larger cross-sectional dimension than that of said first portion shank and being formed as an anti-chafe and bight-keeper collar for protecting and retaining said loop end bight of said tension element.

13. The combination of claim 12 wherein said neck-like protrusion includes a third portion joined integrally to an end of said second portion remote from said first portion, said third portion having a sub-neck portion of smaller cross-sectional dimension than said second portion and an enlarged free-end head portion joined by said sub-neck portion to said second portion.

14. The combination of claim 13 wherein said first, second and third portions of said neck-like protrusion extend generally co-axially in a linear array.

15. The combination of claim 13 wherein said first, second and third portions of said neck-like protrusion extend in a curved composite goose-neck configuration with at least a majority of the goose-neck curvature located between said second and third portions.

16. The combination of claim 13 wherein said free-end head portion has an external configuration of a Tee-head with a cross-arm portion oriented with its longitudinal axis generally perpendicular to that of said third portion.

17. The combination of claim 16 wherein said longitudinal axis of said cross-arm portion extends linearly in a straight line.

18. The combination set forth in claim 16 wherein said longitudinal axis of said cross-arm portion is curved away from said third portion between an integral junction with said third portion and a pair of axially opposed free ends of said cross-arm portion.

19. The combination of claim 16 in further combination with a support structure having an attachment wall with front and rear surfaces and a through-opening extending between said wall surfaces, said wall opening being contoured as an elongated slot having a major lengthwise dimension and a minor width dimension, said slot width dimension being just large enough to pass said Tee-head therethrough with said cross-arm axis oriented parallel to said slot lengthwise dimension and dimensioned small enough to block such through-passage of said Tee-head when rotated to orient said cross-arm axis transverse to said slot lengthwise dimension but large enough to allow through-passage of said neck-like protrusion regardless of such said cross-arm axis relative to said slot lengthwise dimension, said anchoring bead being held by abutment of said cross-arm portion of said Tee-head with said wall rear surface to thereby support said receptacle adjacent said wall front surface side with said neck-like protrusion strung through said wall opening slot.

20. The combination of claim 19 wherein said attachment wall has a pair of rows of teeth, one row disposed adjacent each longitudinal margin of said through-opening, and wherein said rows of teeth are operable to be selectively seatingly engaged by said Tee-head cross-arm to provide the abutment with said wall rear surface and to resist motion of said anchoring bead along the opening in the direction of the lengthwise dimension thereof.

21. The combination of claim 13 wherein said free-end head portion has an external configuration of a curved hook eye.

22. The combination of claim 13 wherein said free-end head portion has an external configuration of an arrow-head type one-way locking tang with a pair of generally diametrically opposite spring fingers tapering divergently as they extend from a free distal end point of said arrow-head tang toward said second portion of said anchoring bead.

23. The combination of claim 15 wherein said block of bead material and said protrusion free-end head portion are both generally spherical in exterior configuration and said second portion is generally circular in diametrical cross-section.

24. The combination set forth in claim 23 wherein said protrusion free-end head portion has a weight-and-material-reducing core outs or through-passage oriented with its longitudinal axis parallel to that of said bead through-passageway.

25. The combination of claim 23 in further combination with a support structure having an attachment wall with front and rear surfaces and a through-opening extending between said wall surfaces, said wall opening being contoured with a first opening portion dimensioned large enough to pass said free-end head portion therethrough and a second opening portion opening to said first opening portion and dimensioned small enough to block such through-passage of said head portion but large enough to allow through-passage of said flexible hanger tension element, said free end head portion being held by abutment with said wall rear surface to thereby support said receptacle adjacent said wall front surface side with said sub-neck portion of said neck-like protrusion strung through said wall opening second portion.

26. The combination of claim 1 in further combination with a support structure having an attachment wall with front and rear surfaces and a through-opening extending between said wall surfaces, said wall opening being contoured with a first opening portion dimensioned large enough to pass said bead block of material therethrough and a second opening portion opening to said first opening portion and dimensioned small enough to block such through-passage of said block but large enough to allow through-passage of said sub-neck portion of said neck-like protrusion, said bead block being held by abutment with said wall rear surface to thereby support said receptacle adjacent to said wall front surface side with said tension element strung through said wall opening second portion.

27. A cargo holder comprising in combination at least one flexible hanger tension element secured to said holder and extending therefrom and terminating at a free end in the form of a U-shaped loop made up of first and second runs interconnected by an end bight, and a hanger bead releasably attached to said hanger element at said free end thereof, said bead comprising a block of material defining a bead having loop-bight engagement means disposed on a first side surface of said bead including a neck-like protrusion extending radially outwardly from the exterior of said first side surface of said bead, said loop end bight being hooked over and thereby trained around said protrusion, said protrusion being constructed and arranged such that said loop and bight are releasably retained on said bead by snug engagement with said protrusion bead loop-bight-engagement means to thereby securely but detachably affix said bead to said hanger element of said cargo holder, and wherein said tension element comprises a resiliently elongated plastic cord, and wherein said protrusion comprises a first shank portion integrally joined at a first end to said first side surface of said bead and extending generally radially outwardly therefrom to a second end, and a second hook-eye portion having a first end integrally joined to said shank portion second end and a second end in the form a free-end terminus of said hook-eye portion, said hook-eye portion in between said first and second ends thereof having re-entrant curvature relative to said shank portion with a predetermined radius of curvature slightly smaller than the radius dimension of said elastic cord tension element when in an unstretched free state condition thereof, said free end terminus of said hook-eye portion defining a gap with said bead first side surface having an opening dimension at its narrowest region only slightly larger than the minimum diameter of said elastic cord tension element when stretched substantially to its working elastic stress limit.

28. The combination of claim 27 wherein said bead block of material is externally generally spherically contoured.

29. The combination of claim 28 wherein said bead block has a weight-and-material-reducing core outs or through-passage oriented with its longitudinal axis parallel to the axis of said loop bight as so snug engaged with said protrusion.

30. The combination of claim 28 in further combination with a support structure having an attachment wall with front and rear surfaces and a through-opening extending between said wall surfaces, said wall opening being contoured with a first opening portion dimensioned large enough to pass said bead block therethrough and a second opening portion opening to said first opening portion and dimensioned small enough to block such through-passage of said bead block but large enough to allow through-passage of said neck-like protrusion, said bead block being held by abutment with said wall rear surface to thereby support said receptacle adjacent said wall front surface side with said neck-like protrusion strung through said wall opening second portion.

31. The combination of claim 27 wherein said first shank portion of said neck-like protrusion extends generally linearly between said first and second ends thereof.

32. The combination of claim 27 wherein said first and second portions of said neck-like protrusion extend in a curved composite goose-neck configuration with at least a majority of the goose-neck curvature located between said first and second ends of said first shank portion.

33. A method of affixing a fastener bead to a flexible tension element to provide as a cargo holder hanger sub-assembly of the type used by removably inserting the bead in the wider portion of a keyhole-type slot in a support structure and then the bead moved so as to be trapped and held by the margin of the narrow portion of the slot with the tension element passing outwardly therethrough to a supporting attachment of the tension element to the cargo holder, said method comprising the steps of:

(a) providing a flexible hanger tension element adapted to be secured to the cargo holder so as to extend therefrom and terminate at a free end in the form of a U-shaped loop made up of first and second runs interconnected by an end bight, (b) providing a hanger bead adapted for releasable attachment to the hanger flexible tension element at said free end thereof, said bead comprising a block of material having a through-passageway defining axially opposite loop-entrance and loop-exit ends thereof located respectively at first and second opposite end surfaces of said bead block, said bead further having loop-bight engagement means disposed on a first side surface of said bead block and aligned at least partially between said passageway axially opposite ends, said bead loop-bight-engagement means including an external groove in the first side surface of the bead sized for retaining a portion of each the first and second runs of the loop disposed exteriorly of the bead passageway and in side-by-side contacting relationship when they exit the passageway exit end and are lead to engagement with the loop-bight-engagement means, (c) feeding said first and second runs with said loop bight leading such that said runs extend from said holder into said passageway entrance end and thence are fed in side-by-side contacting relationship through said passageway and thence exit out said passageway exit end, with the following trailing portions of the runs trailing back out the entrance end of the passageway as they extend back toward a cargo holder attachment region of the tension element, (d) then training the exited loop bight and runs over a second side surface of said bead located diametrically opposite said bead first side surface until the loop bight contacts and crosses over the trailing portions of the tension element runs on the side thereof remote from the bead first side surface and generally where the trailing runs are leading toward entry into the entrance end of the bead passageway, (e) then pulling and spreading apart the exited portions of the loop runs to straddle displace them around the bead exterior from the second side surface to the first side surface thereof while said bight remains caught by crossing over the trailing portions of the tension element runs, (f) then inserting the exited portions of the loop runs as so disposed in step (e) into the bead groove, and (g) exerting retrograde tension force on said trailing run portions while restraining said bead against such force to thereby cause said loop and bight to be releasably retained on said bead by snug engagement with said bead groove and by catching of the loop bight across the trailing runs as they enter the passageway to thereby securely but detachably affix the bead to the flexible tension element and thereby complete the cargo holder hanger sub-assembly.

34. An anchoring bead fastener for use with a cargo retaining receptacle of the type having a flexible hanger tension element secured to the receptacle and extending therefrom and terminating at a free end in the form of a U-shaped loop made up of first and second runs interconnected by an end bight, said anchoring bead fastener being adapted to be releasably attached to said hanger element at the free end thereof, said bead fastener comprising a block of material defining a bead and having a through-passageway defining axially opposite loop-entrance and loop-exit ends thereof located respectively at first and second opposite end surfaces of said bead, said bead further having loop-bight-engagement means disposed on a first side surface of said bead and aligned at least partially between said passageway axially opposite ends and adapted to receive the runs of the loop extending from said receptacle into said passageway entrance end and thence in side-by-side contacting relationship through said passageway and thence out said passageway exit end such that the loop and bight are releasably retained on said bead by snug engagement with said bead loop-bight-engagement means to thereby securely but detachably affix said bead to the hanger tension element of the receptacle.

35. The bead fastener of claim 34 wherein said bead loop-bight-engagement means includes an external groove in said first side surface of said bead for retaining a portion of each the first and second runs of the loop disposed exteriorly of said bead passageway and in side-by-side contacting relationship as they exit said passageway exit end and as they lead to the loop bight when the loop bight is in said snug engagement with said loop-bight-engagement means.

36. The bead fastener of claim 34 wherein said loop-bight-engagement means is adapted to cooperate with a bight-retaining portion of each of the first and second runs of the tension element disposed exteriorly of said bead and immediately adjacent and leading into said passageway entrance end such that the said loop bight traverses the bight-retaining portions of the runs on the side thereof remote from said bead first side.

37. The bead fastener of claim 36 wherein said bead loop-bight-engagement means includes an external groove in said first side surface of said bead adapted for retaining an exited portion of each the first and second runs of the loop disposed exteriorly of said bead passageway and in side-by-side contacting relationship as they exit said passageway exit end and as they lead to the loop bight when the loop bight is in said snug engagement with said loop-bight-engagement means.

38. The bead fastener of claim 37 wherein said bead block of material is externally generally spherically contoured.

39. The bead fastener of claim 37 wherein said bead block of material is externally generally doughnut shaped about a major axis and the longitudinal axis of said through-passageway is oriented generally parallel to the major axis of said doughnut shape of said bead block.

40. The bead fastener of claim 39 wherein said entrance and exits ends of said passageway are defined exteriorly of said bead by individually associated surrounding margin surfaces each recessed from an adjacent exterior surface portion of said bead and merging with a root surface of said groove in said bead first side surface.

41. The bead fastener of claim 40 wherein said doughnut shape of said bead is defined by a ring-like band of material centered on said major axis and having an exteriorly convex surface encircling said through-passageway except for an interruption formed in said convex surface by said external groove.

42. The bead fastener of claim 41 wherein said convex surface varies in width and is widest adjacent said external groove to provide flanking shoulders along said groove to assist in retaining the exited portion of the runs when disposed in said external groove.

43. The bead fastener of claim 42 wherein said passageway longitudinal axis is offset laterally from said major axis of said ring-like band of material with said offset being in a direction diametrically away from said external groove to thereby increase the amount of ring material forming said flanking groove shoulders of said bead and thereby strengthening said shoulders.

44. The bead fastener of claim 34 wherein said loop-bight-engagement means of said bead comprises a neck-like protrusion extending radially outwardly from the exterior of said first side surface of said bead and constructed and arranged such that the loop end bight can be hooked over and thereby trained around said protrusion on the side thereof remote from said through-passageway exit end.

45. The bead fastener of claim 44 wherein said neck-like protrusion comprises first and second portions formed integrally end-to-end, said first portion being integrally joined at one end to said bead at said first surface and having a shank of a reduced cross-sectional dimension and constructed such that the tension element loop end bight may be trained around, said second portion having a substantially larger cross-sectional dimension than that of said first portion shank and being formed as an anti-chafe and bight-keeper collar for protecting and retaining said loop end bight of said tension element.

46. The bead fastener of claim 45 wherein said neck-like protrusion includes a third portion joined integrally to an end of said second portion remote from said first portion, said third portion having a sub-neck portion of smaller cross-sectional dimension than said second portion and an enlarged free-end head portion joined by said sub-neck portion to said second portion.

47. The bead fastener of claim 46 wherein said first, second and third portions of said neck-like protrusion extend generally co-axially in a linear array.

48. The bead fastener of claim 46 wherein said first, second and third portions of said neck-like protrusion extend in a curved composite goose-neck configuration with at least a majority of the goose-neck curvature located between said second and third portions.

49. The bead fastener of claim 48 wherein said block of bead material and said protrusion free-end head portion are both generally spherical in exterior configuration and said second portion is generally circular in diametrical cross-section.

50. The bead fastener of claim 49 wherein said protrusion free-end head portion has a weight-and-material-reducing cavity means oriented with its longitudinal axis parallel to that of said bead through-passageway.

51. The anchoring bead as set forth in claim 46 wherein said free-end head portion has an external configuration of a Tee-head with a cross-arm portion oriented with its longitudinal axis generally perpendicular to that of said third portion.

52. The anchoring bead of claim 51 wherein said longitudinal axis of said cross-arm portion extends linearly in a straight line.

53. The anchoring bead of claim 51 wherein said longitudinal axis of said cross-arm portion is curved away from said third portion between an integral junction with said third portion and a pair of axially opposed free ends of said cross-arm portion.

54. The anchoring bead of claim 46 wherein said free-end head portion has an external configuration of a curved hook eye.

55. The anchoring bead of claim 46 wherein said free-end head portion has an external configuration of an arrow-head type one-way locking tang with a pair of generally diametrically opposite spring fingers tapering divergently as they extend from a free distal end point of said arrow-head tang toward said second portion of said anchoring bead.

56. A method of affixing a fastener bead to a flexible tension element to provide as a cargo holder hanger sub-assembly of the type used by removably inserting the bead in the wider portion of a keyhole-type slot in a support structure and then the bead moved so as to be trapped and held by the margin of the narrow portion of the slot with the tension element passing outwardly therethrough to a supporting attachment of the tension element to the cargo holder, said method comprising the steps of:

(a) providing a flexible hanger tension element adapted to be secured to the cargo holder so as to extend therefrom and terminate at a free end in the form of a U-shaped loop made up of first and second runs interconnected by an end bight, (b) providing a hanger bead adapted for releasable attachment to the hanger flexible tension element at said free end thereof, said bead comprising a block of material defining a bead having a through-passageway defining axially opposite loop entrance and loop-exit ends thereof located respectively at first and second opposite end surfaces of said bead, said bead further having loop-bight engagement means disposed on a first side surface of said bead block and aligned at least partially between said passageway axially opposite ends and including an external groove sized for retaining a portion of the loop disposed exteriorly of the bead passageway when they exit the passageway exit end and are lead to engagement with the loop-bight-engagement means, (c) feeding said first and second runs with said loop bight leading such that said runs extend into said passageway entrance end and thence are fed in side-by-side contacting relationship through said passageway with a snug fit and thence exit out said passageway exit end, with the following trailing portions of the runs trailing back out the entrance end of the passageway as they extend back toward a cargo holder attachment region of the tension element, (d) then training the exited loop bight and runs over said bead until the loop bight crosses over said bead loop-bight engagement means remote from said loop-exit end of said through-passageway, (e) then orienting the exited portions of the loop runs to thereby insure that said bight remains caught by crossing over said bead loop-bight engagement means, (f) inserting the exited portions of the loop runs as so disposed in step (e) into the bead loop-bight engagement means groove, and (g) exerting retrograde tension force on said trailing run portions while restraining said bead against such force to thereby cause said loop and bight to be releasably retained on said bead by snug engagement with said groove to thereby securely but detachably affix the bead to the flexible tension element and thereby complete the cargo holder hanger sub-assembly.

* * * * *